(12) United States Patent
Yukawa et al.

(10) Patent No.: US 6,450,225 B2
(45) Date of Patent: Sep. 17, 2002

(54) NOISE DAMPER FOR PNEUMATIC TIRE

(75) Inventors: Naoki Yukawa; Masami Nishikawa; Chieko Aoki; Hideaki Sugihara, all of Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/742,403

(22) Filed: Dec. 22, 2000

(30) Foreign Application Priority Data

| Dec. 22, 1999 | (JP) | 11-365465 |
| Dec. 22, 1999 | (JP) | 11-365467 |
| Dec. 22, 1999 | (JP) | 11-365468 |
| Dec. 22, 1999 | (JP) | 11-365469 |
| Dec. 28, 1999 | (JP) | 11-374870 |
| Dec. 28, 1999 | (JP) | 11-374872 |

(51) Int. Cl.$^7$ .................. B60B 21/02; B60B 19/00; B60C 15/02; B60C 11/03
(52) U.S. Cl. ............... 152/381.6; 152/209.2; 152/339.1; 301/6.91
(58) Field of Search ............... 295/7; 301/5.21, 301/5.22, 6.91; 152/381.6, 381.5, 153, 209.2, 450, 209.4, 209.6, 209.7, 339.1, 311, 391, 399

(56) References Cited

U.S. PATENT DOCUMENTS

| 516,669 | A | * | 3/1894 | Washburn | 152/381.6 |
| 3,047,285 | A | * | 7/1962 | Gross | 152/339.1 |
| 3,930,526 | A | * | 1/1976 | Edwards | 301/5.22 |
| 4,480,669 | A | * | 11/1984 | Skidmore | 152/153 |
| 5,390,718 | A | * | 2/1995 | Victor | 152/399 |

FOREIGN PATENT DOCUMENTS

JP          7-14682 B2  *  2/1995

* cited by examiner

*Primary Examiner*—S. Joseph Morano
*Assistant Examiner*—Jason R. Bellinger
(74) *Attorney, Agent, or Firm*—Birch, Stewart, Kolasch & Birch, LLP

(57) ABSTRACT

A tire noise damper to be disposed in an annular tire hollow formed between a wheel rim and a pneumatic tire mounted thereon, the damper made of a flexible material and comprising a base to be secured to the wheel rim and at least one flap extending from the base to be risen radially outwards from the wheel rim by centrifugal force during running to block the annular tire hollow. For example, the damper comprises at least one annular elastic band to be put around the wheel rim, the annular band provided with at least one U-cut for forming a flap, and the base is formed by the remaining annular portion of the band. In another example, the damper is made of a strip of the fixable material having a certain length, the base is formed by one end portion of the strip, and the flap is formed by the remaining portion of the strip.

23 Claims, 34 Drawing Sheets

NOISE DAMPER FOR PNEUMATIC TIRE

BACKGROUND OF THE INVENTION

The present invention relates to a noise damper for pneumatic tire which is disposed in a tire hollow and secured to a wheel rim.

In recent years, as the mechanical noise from automobiles especially passenger cars is greatly reduced, the tires especially passenger car tires are strongly required to reduce their noise. There are many factors in the tire noise, but a circumferential resonance of the air in the annular tire hollow is a major factor. That is, a ring of air inside the tire continuous around the rim is excited by vibrations during running and resonates in the circumferential direction. Usually, a resonance peak occurs in a frequency range of from 50 to 400 Hz according to the tire size.

In the published Japanese patent JP-B-7-14682, an assembly of a wheel rim and a pneumatic tire mounted thereon is disclosed, wherein a ball-like body which is made of rubber, sponge or the like is put in the annular tire hollow to block the circumferential continuity thereof to control resonance. Such a ball-like body is however, liable to disturb the high-speed rotational balance of the tire because the inner surface of the tire receives a full gravity of the ball-like body which increases as the rotational speed increases. Further, it has a tendency to make it difficult to mount the tire on a wheel rim.

SUMMARY OF THE INVENTION

It is therefore, an object of the present invention to provide a noise damper which can control resonance of the tire hollow to reduce tire noise without sacrificing the high-speed balance and rim-mounting operation.

According to the present invention, a tire noise damper is made of a flexible material and comprises a base to be secured to a wheel rim and at least one flap extending from the base to be risen radially outwards from the wheel rim by centrifugal force during running to block the annular tire hollow.

Definitions

"Standard loaded condition" is that the tire is mounted on a standard rim and inflated to a standard pressure, and then loaded with 74% of a standard load.

"Normally-inflated unloaded condition" is that the tire is mounted on the standard rim and inflated to the standard pressure, but loaded with no tire load.

The standard rim is the "standard rim" specified in JATMA, the "Measuring Rim" in ETRTO, the "Design Rim" in T&RA or the like.

The standard pressure is the "maximum air pressure" in JATMA, the "Inflation Pressure" in ETRTO, the maximum pressure given in the "Tire Load Limits at Various Cold Inflation Pressures" table in T&RA or the like. In case of passenger car tires, however, 200 kPa is used as the standard pressure.

The standard load is the "maximum load capacity" in JATMA, the "Load Capacity" in ETRTO, the maximum value given in the above-mentioned table in T&RA or the like.

DESCRIPTION OF THE PREFERRED EMBODIMENTS

Figure 1:
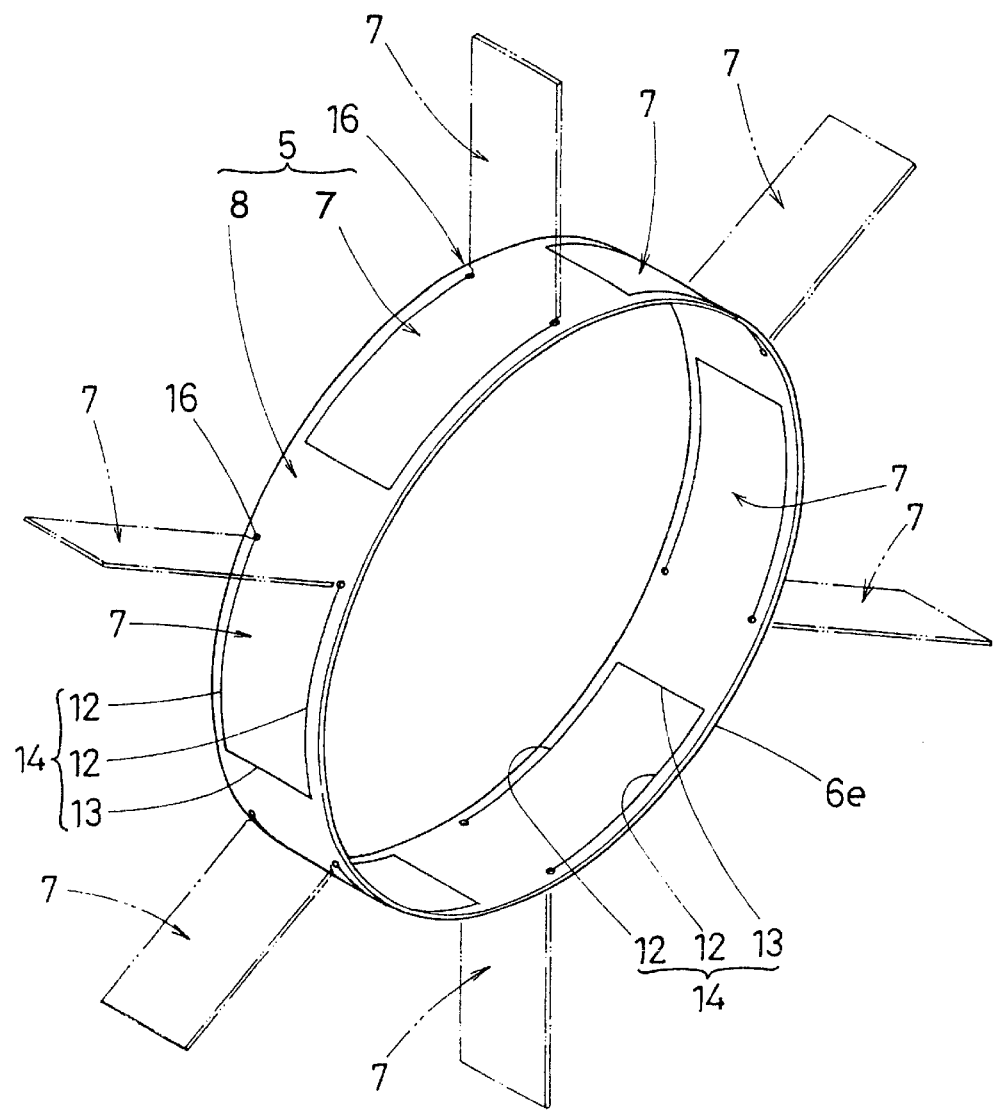
FIG. 1 is a perspective view of a damper according to the present invention.
Figure 2:
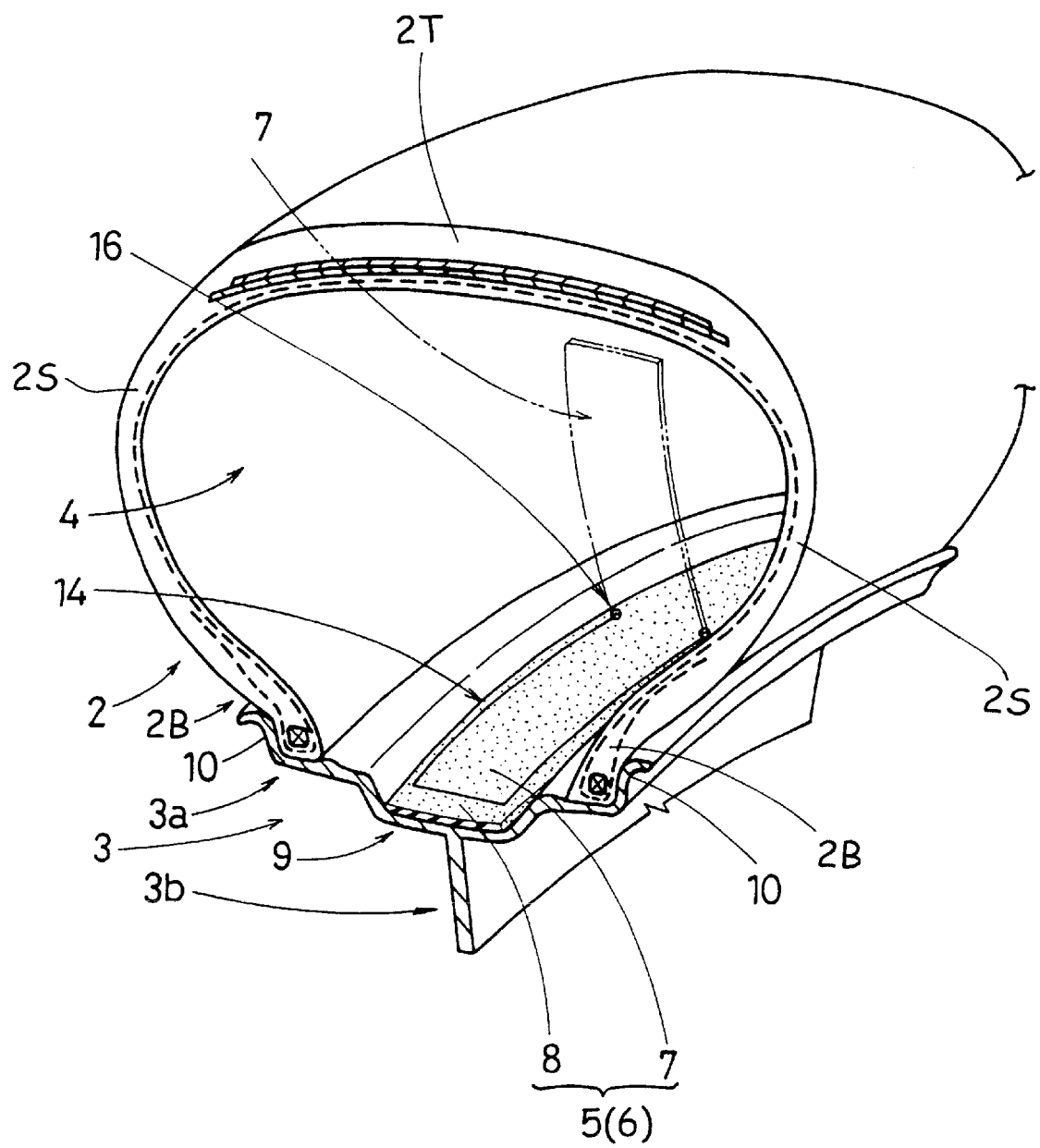
FIG. 2 is a perspective view showing the damper which is put around a wheel rim on which a pneumatic tire is mounted.

Embodiments of the present invention will now be described in detail in conjunction with the accompanying drawings.

In the drawings, pneumatic tire 2 is mounted on a standard wheel rim 3 and an annular closed tire hollow 4 is formed around the wheel rim 3a.

According to the present invention, a noise damper 5 is made of a relatively thin flexible material and comprises at least one flap 7 and a base 8 secured to the wheel rim 3 before the pneumatic tire 2 is mounted on the wheel rim 3. The noise damper 5 is constructed so that the flap 7 is risen in the tire hollow 4 from the base 8 towards the radially outside by centrifugal force during running whereby the flap 7 can block off the annular hollow 4.

The pneumatic tire 2 is a tubeless tire comprising a tread portion 2T, a pair of sidewall portions 2S and a pair of bead portions 2B. For example, the tire 2 is a radial tire for passenger cars.

The wheel rim 3 comprises a pair of axially spaced bead seats 3a on which the tire bead portions 2B seat, a rim well 9 between the bead seats, and a pair of flanges 10 each extending radially outwardly from one of the bead seats 3a so as to extend along the axially outer surface of the bead portion 2B. For example, the wheel rim 3 is provided around a disk 3b.

Annular Dampers

In FIGS. 1–29, each noise damper 5 is made of at least one elastic annular band 6 which is provided with at least one U-cut 14. The elastic annular band 6 is put around the wheel rim 3 without slack. The direction of the U-cut 14 is such that the opening of the letter "U" is towards the circumferential direction. In other words, a pair of substantially-straight substantially-parallel cuts 12 (hereinafter outer longitudinal cuts 12) extend in the circumferential direction, and a lateral cut 13 extends between the ends G of the two longitudinal cuts 12.

Preferably, the band 6 is made of a vulcanized rubber. For such vulcanized rubber, diene rubbers such as natural rubber (NR), isoprene rubber (IR), butadiene rubber (BR), styrene butadiene rubber (SBR), nitrile rubber (NBR), chloroprene rubber (CR) and the like are preferably used. Especially NR and SBR are preferably used.

The thickness of the band 6 is set in a range of from 0.5 to 3 mm, preferably 0.5 to 2 mm, more preferably 1 to 2 mm.

The size of the band 6 is determined such that the circumference Lb when put around the rim is in a range of more than 1.0 but not more than 1.3 times, preferably in a range of from 1.08 to 1.16 times the original circumference La. In other words, the elongation of the band is not more than 30%, preferably in a range of from 8 to 16%.

The distance X from the axial edges 6e of the band 6 to the longitudinal cuts 12 is set to be at least 2 mm, preferably more than 3 mm, more preferably more than 5 mm.

Therefore, by the U-cut 14, the under-mentioned normal flap or oblique flap (generically flap 7) which can be risen from the outer surface of the wheel rim 3 towards the radially outside by centrifugal force during running is formed.

In order to avoid stress concentration on the dead ends of the cuts and prevent the band 6 from tearing, a circular hole 16 for dispersing stress is preferably formed at the dead ends. The diameter (d) thereof is 2 to 6 mm, preferably 3 to 5 mm. Of course, other round shapes such as oval and the like can be also used. Also such holes 16 can help the flap 7 to rise.

As to the width BW of the band 6, it is preferable that the width BW is not more than the bottom width RW of the rim well 9 so that the band 6 can completely sink in the rim well 9 when mounting the tire 2 on the rim 3. Therefore, the width BW is usually set to be substantially equal to the bottom width RW, and substantially constant in the circumferential direction. Thus the edges 6e are substantially parallel with each other.

Annular Damper 1A

Figure 3:
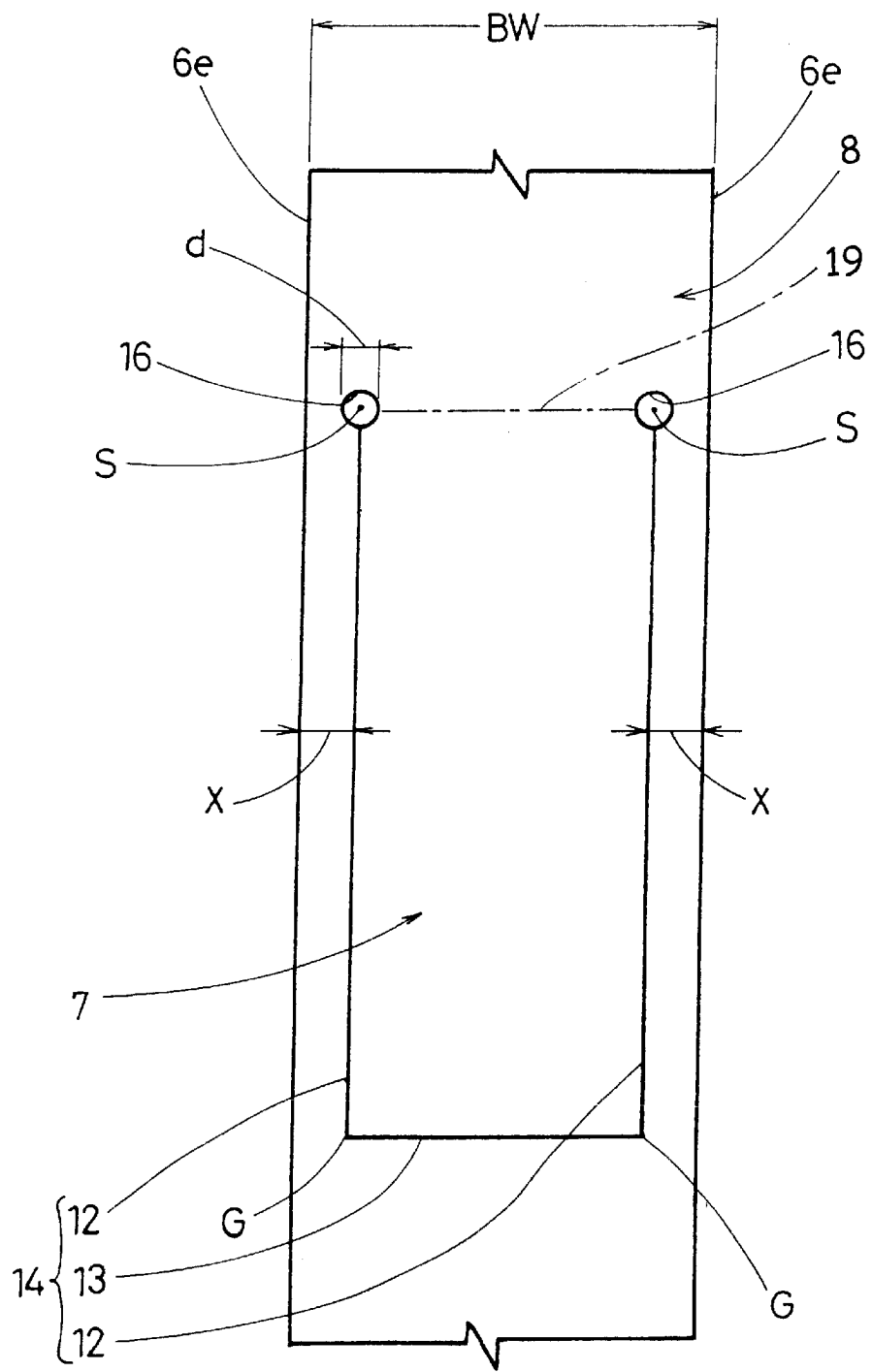
FIG. 3 is a partial view of the damper showing a basic U-cut.

FIGS. 1 to 4 show an example of the damper 5, which is made up of a single band 6. In this example, as shown in FIG. 3, the two longitudinal cuts 12 have the same length, and the dead ends S of the two longitudinal cuts 12 are at the circumferentially same positions. Accordingly, a bend line 19 drawn straight between the dead ends S is parallel with the tire axial direction. The lateral cut 13 extending between the other ends G of the two longitudinal cuts 12 is straight and parallel with tire axial direction. Thus, the flap 7 in this example is a rectangle and rises normally, that is, it is a rectangular normal flap.

The band 6 is provided with a plurality of U-cuts 14 at substantially regular intervals, and all the U-cuts 14 are oriented towards the same circumferential direction. As a result, a plurality of normal flaps 7 are formed evenly in the circumferential direction. In FIG. 1, the number of the flaps 7 is six, but it can changed for example two or three or four etc.

Blockade area

Figure 4:
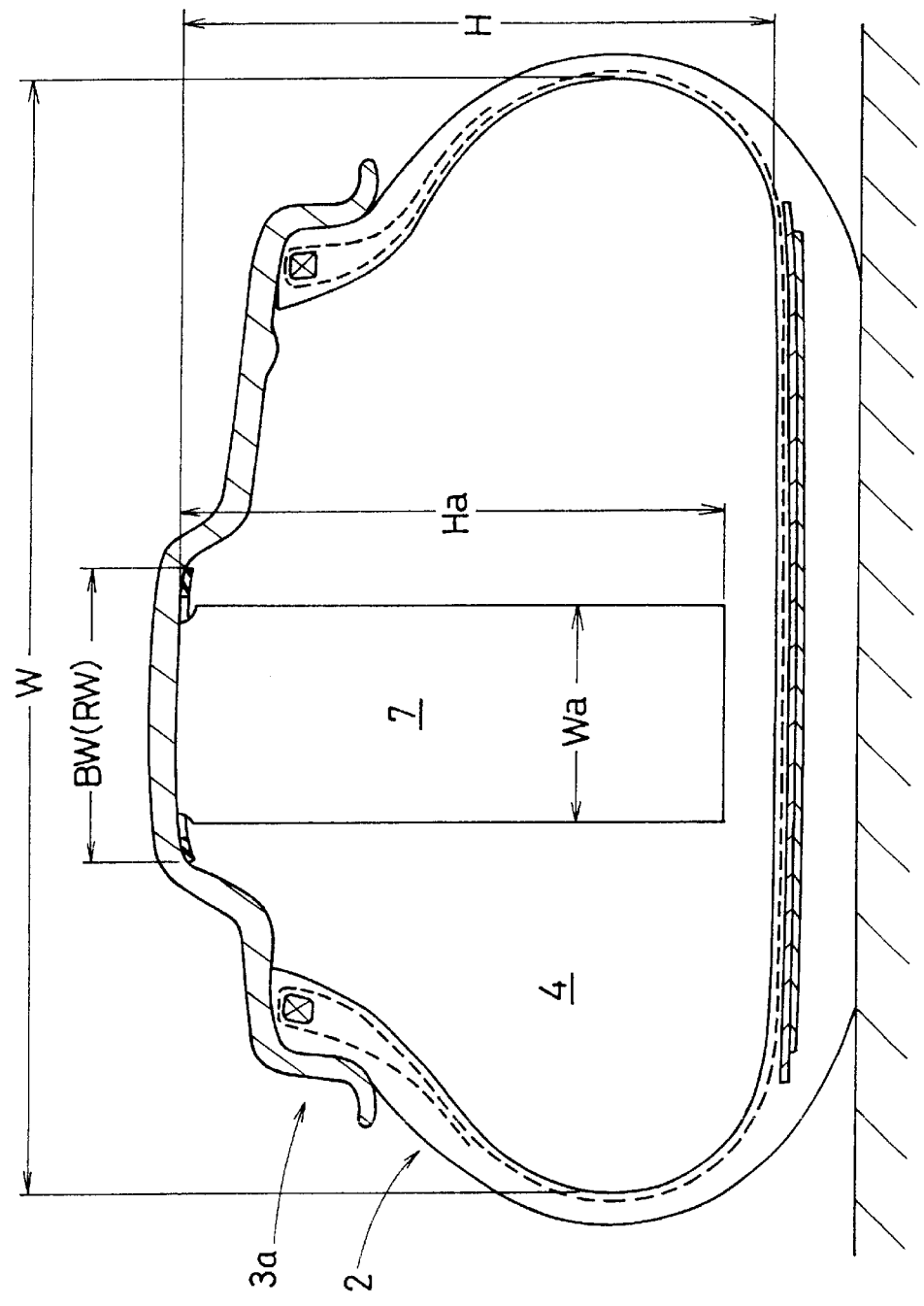
FIG. 4 is a cross sectional view of the ground contacting patch of the assembly of the tire, wheel rim and damper.

The blockade area Ab by the fully risen flap 7 is must be at least 5%, preferably more than 10%, more preferably more than 15%, still more preferably more than 20% of the total sectional area As of the tire hollow 4 under the normally inflated unloaded condition. The blockade area Ab is the area of the flap 7 when viewed in the circumferential direction. For example, in case of FIG. 4, the blockade area Ab is Ha X Wa. To meet this condition, the width and rising height of the flaps are determined as follows. The height Ha (maximum rise) of the flap 7 is set in the range of from 85 to 100% of the height H of the tire hollow 4. Further, the axial width Wa of the flap 7 is at least 20% of the width W of the tire hollow 4. The height H and width W of the tire hollow 4 are measured in the ground contacting patch of the tire under the standard loaded condition as shown in FIG. 4.

These limitations to Ab, Ha and Wa are also applied to the following examples if not specifically mentioned.

Annular Damper 1B

Figure 5:
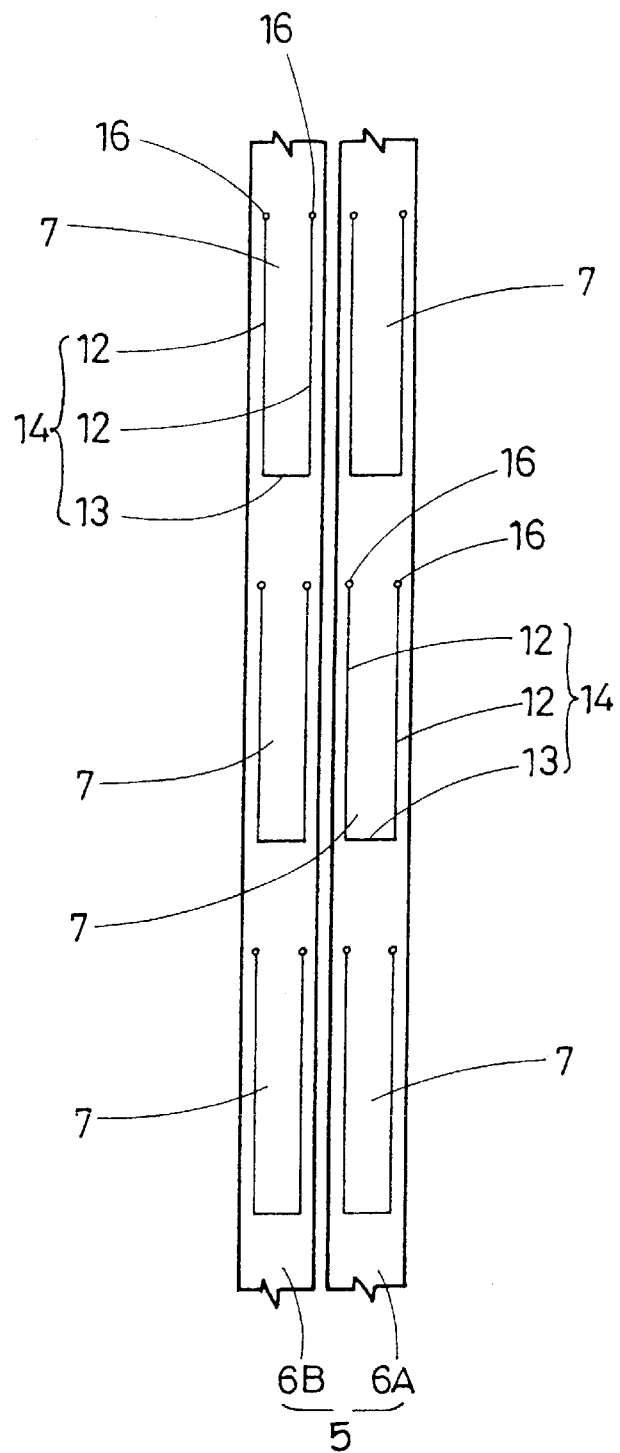
FIG. 5 is a partial view of a damper according to the present invention.
Figure 6:
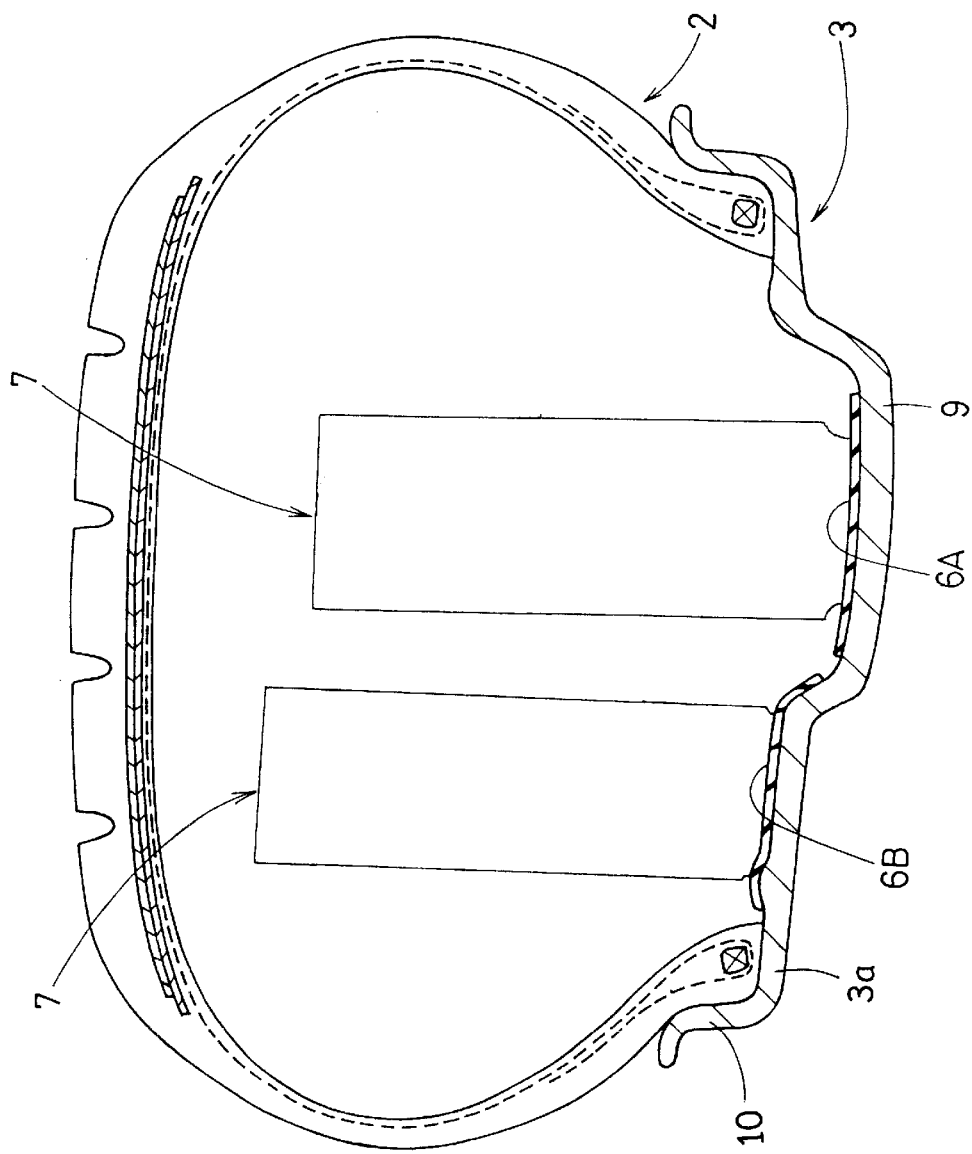
FIG. 6 is a cross sectional view showing the damper which is put around a wheel rim on which a pneumatic tire is mounted.

FIGS. 5 and 6 show another example of the damper 5 which is made up of two bands 6 (6A and 6B) disposed side by side in order to increase the total blockade area. The bands 6A and 6B are each provided with three U-cuts 14, and three normal flaps 7 rise evenly in the circumferential direction. All the U-cuts 14 are oriented towards the same direction, and the flaps 7n of the band 6A are aligned with those of the band 6B. For example, the band 6A is disposed in the rim well 9, and the band 6b is disposed in a shoal between the rim well 9 and one of the bead seats 3a.

Annular Damper IC

Figure 7:
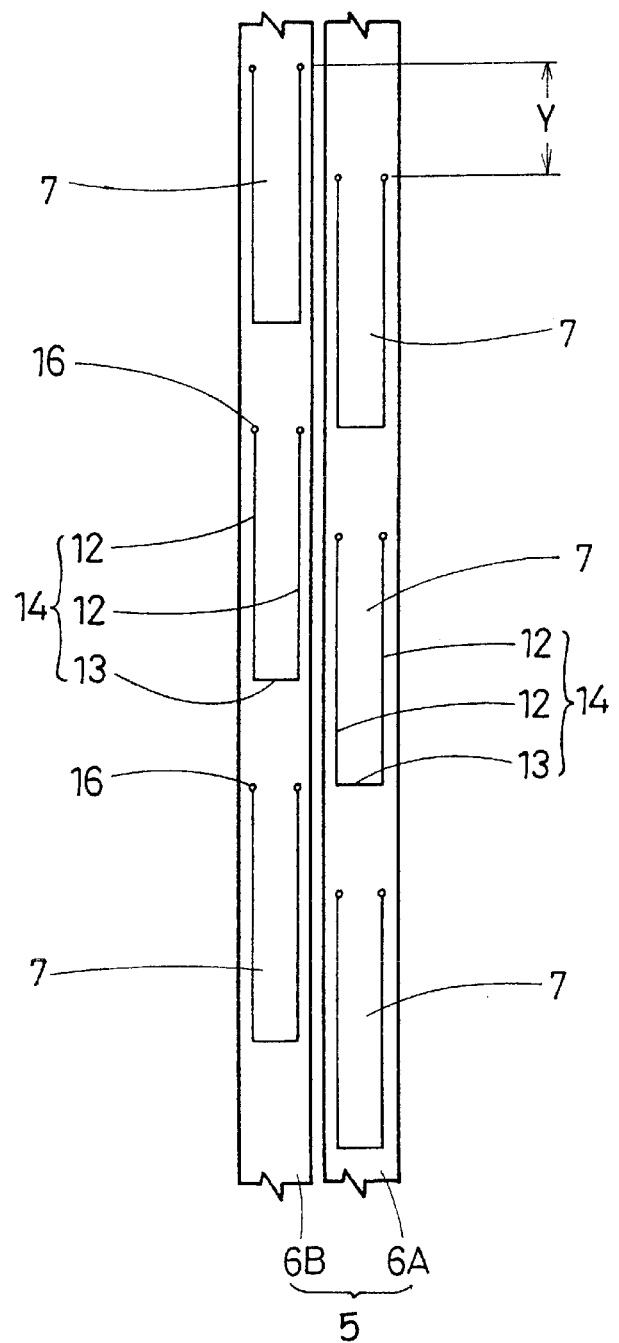
FIG. 7 is a partial view of a damper according to the present invention.
Figure 8:
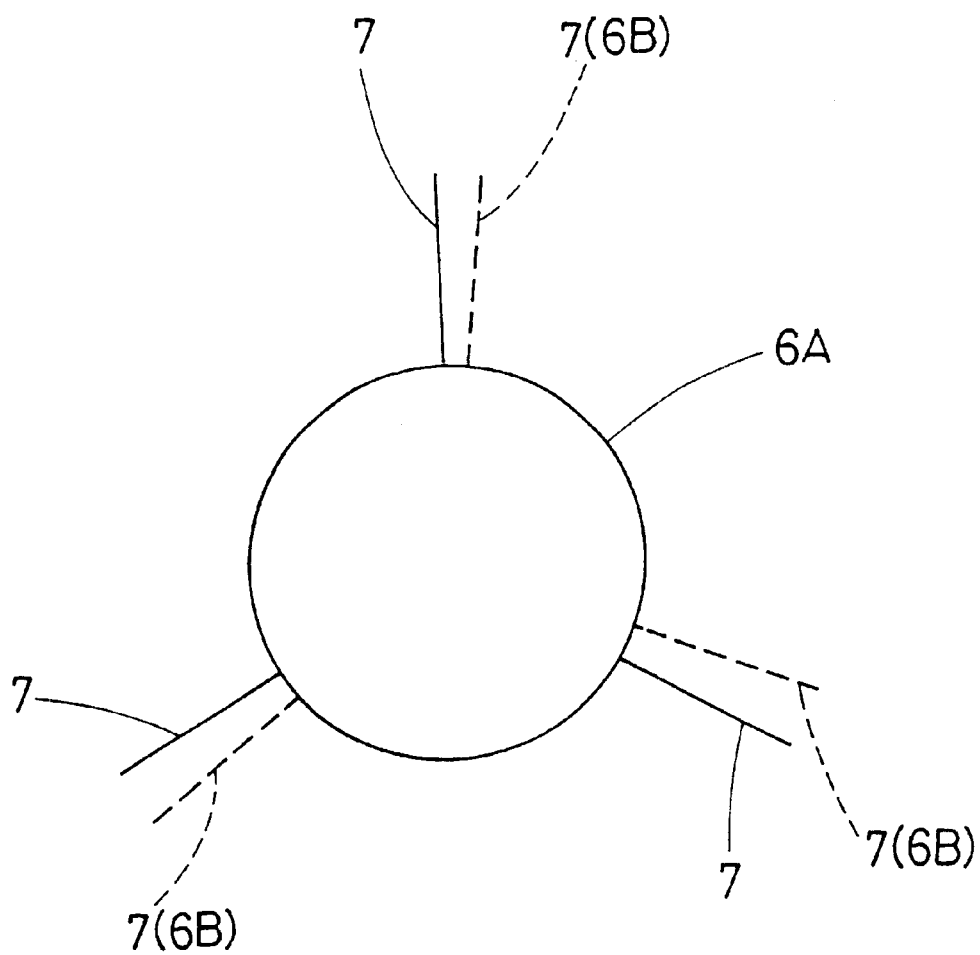
FIG. 8 is a diagram showing the damper in a state that their flaps are risen.

FIGS. 7 and 8 show another example of the damper 5 which is made up of two bands 6 (6A and 6B) disposed side by side. The structure thereof is the same as that of the FIG.

5 example except that the bands 6A and 6B are circumferentially shifted from each other by a certain distance Y, and thereby as shown in FIG. 8 the flaps 7 of the band 6A are not aligned with the flaps 7 of the band 6B.

Annular Damper 2

Figure 9:
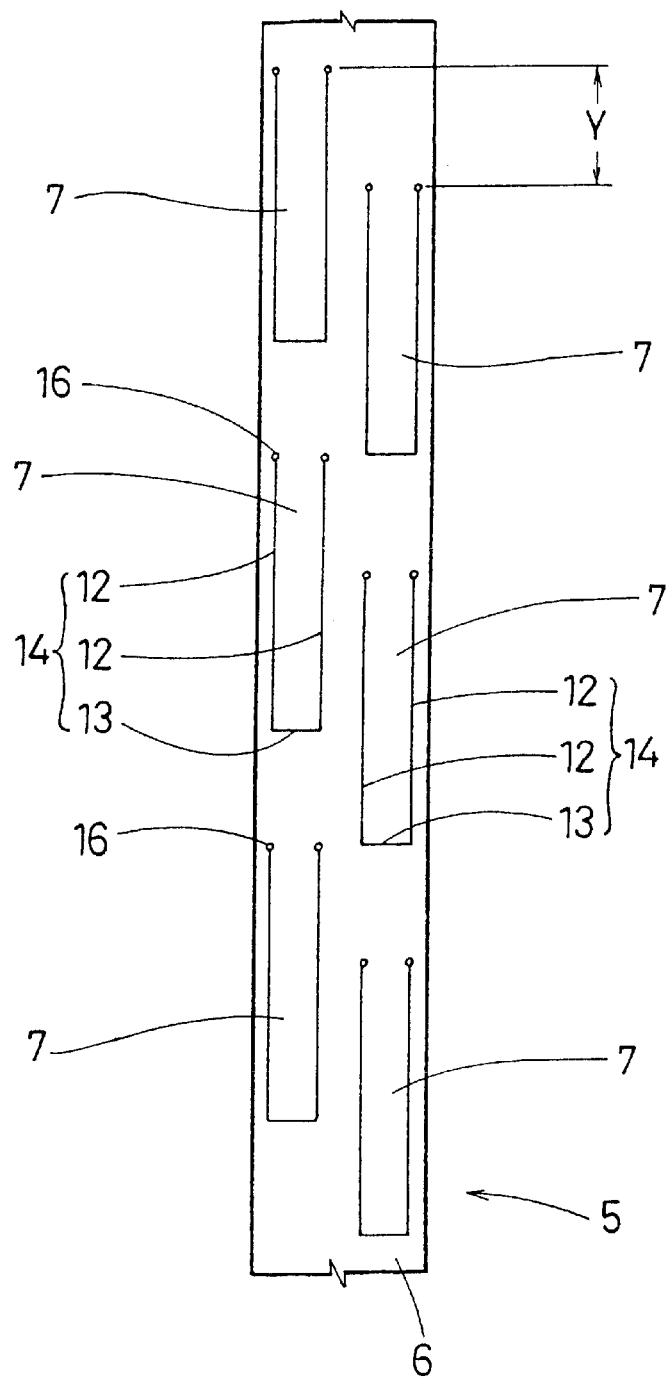
FIG. 9 is a partial view of a damper according to the present invention.
Figure 10:
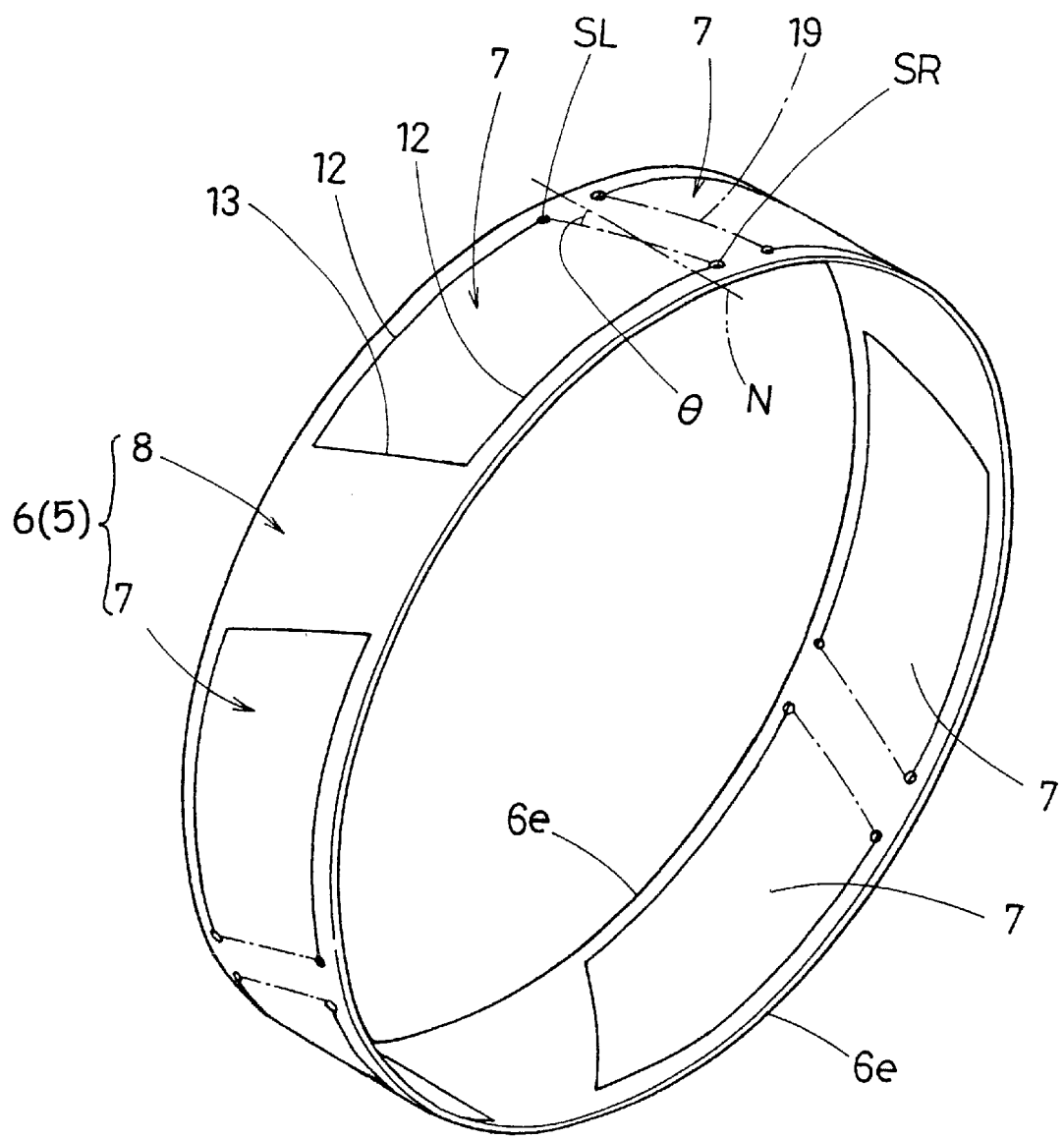
FIG. 10 is a perspective view of a damper according to the present invention.

FIG. 9 shows another example of the damper 5, wherein the band 6 which is provided with U-cuts 14 in a plurality circumferential rows (two rows, in FIG. 9). In this example, all the U-cuts 14 are oriented towards the same direction, and the U-cuts 14 in one row are circumferentially shifted from the U-cuts 14 in the other row by a certain distance Y similarly to the FIG. 7 example. Thus two circumferential rows of flaps 7 can be formed and they are risen as shown in FIG. 8.

Comparison test 1

The above-mentioned annular dampers were installed on a 15X6JJ wheel rim (RW=55 mm and Circumference=110 cm at the bottom of the rim well) and then a 195/65R15 radial tire was mounted thereon. The tire was inflated to 200 KPa, and the following tests were conducted. The results are indicated in Table 1.

Noise test

The wheel or assembly of the tire, rim and damper was mounted on a Japanese 2000cc FR passenger car and run in a noise test course (rough asphalt road) at a speed of 60 km/hr and the sound pressure was measured near the driver's seat to obtain the overall noise level of 226, 240 and 253 Hz. The results are indicated in dB as a difference from Ref. 1.

Durability test

Using a tire test drum, the wheel was rotated at a speed of 60 km/hr (tire load=500 N, pressure=200 KPa). The damper was checked every hour for damages such as cracks at the dead ends of the cuts. If there was no damage after 10 hours, the damper was ranked as "A". If the band was broken, it was ranked as "B".

Tire mounting test

The difficulty of putting the damper around the wheel rim and the difficulty of mounting the tire on the rim by hand were evaluated. In the test results, "A" means "no difficulty", "B" means "little hard".

TABLE 1

| Tire | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| BW (mm) | — | 55 | 55 | 55 | 55 | 55 | 55 | 55 | 55 | 55 | 55 | 55 |
| La (cm) | — | 102 | 102 | 102 | 102 | 120 | 110 | 95 | 89 | 84 | 102 | 102 |
| La/Lb | — | 1.08 | 1.08 | 1.08 | 1.08 | 0.92 | 1 | 1.16 | 1.24 | 1.31 | 1.08 | 1.08 |
| Thickness (mm) | — | 1 | 1 | 1 | 1 | 1 | 1 | 1 | 1 | 1 | 0.2 | 0.5 |
| Flap/U-cut | — | none | FIG. 1 | FIG. 1 | FIG. 1 | FIG. 1 | FIG. 1 | FIG. 1 | FIG. 1 | FIG. 1 | FIG. 1 | FIG. 1 |
| Number | — | 0 | 6 | 1 | 1 | 6 | 6 | 6 | 6 | 6 | 6 | 6 |
| X (mm) | — | — | 7.5 | 3 | 1 | 7.5 | 7.5 | 7.5 | 7.5 | 7.5 | 7.5 | 7.5 |
| Ha (mm) | — | — | 100 | 100 | 100 | 100 | 100 | 100 | 100 | 100 | 100 | 100 |
| Ha/H (%) | — | — | 91 | 91 | 91 | 91 | 91 | 91 | 91 | 91 | 91 | 91 |
| Wa (mm) | — | — | 40 | 49 | 53 | 40 | 40 | 40 | 40 | 40 | 40 | 40 |
| Wa/W (%) | — | — | 21 | 26 | 28 | 21 | 21 | 21 | 21 | 21 | 21 | 21 |
| Dia. of Hole 16 (mm) | — | 0 | 5 | 0 | 0 | 0 | 0 | 5 | 5 | 5 | 5 | 5 |
| Noise (dB) | 0 | −0.1 | −1.6 | −1.1 | −1.2 | −0.5 | −1.4 | −1.6 | −1.3 | −1.4 | −0.3 | −1.3 |
| Durability of Damper | — | A | A | A | B | A | A | A | A | B | A | A |
| Damper mounting | A | A | A | A | A | A | A | A | A | A | A | A |
| Tire mounting | A | A | A | A | A | A | A | A | A | A | A | A |

| Tire | Ex. 11 | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|---|
| BW (mm) | 55 | 55 | 70 | 55 | 55 | 55 | 55 | 55 | 55 | 55 × 2 | 55 × 2 | 55 |
| La (cm) | 102 | 102 | 102 | 102 | 102 | 102 | 102 | 102 | 102 | 102 | 102 | 102 |
| La/Lb | 1.08 | 1.08 | 1.08 | 1.08 | 1.08 | 1.08 | 1.08 | 1.08 | 1.08 | 1.08 | 1.08 | 1.08 |
| Thickness (mm) | 2 | 4 | 1 | 1 | 1 | 1 | 1 | 1 | 1 | 1 | 1 | 1 |
| Flap/U-cut | FIG. 1 | FIG. 1 | FIG. 1 | FIG. 1 | FIG. 1 | FIG. 1 | FIG. 1 | FIG. 1 | FIG. 1 | FIG. 5 | FIG. 7 | FIG. 9 |
| Number | 6 | 6 | 6 | 1 | 2 | 3 | 4 | 5 | 8 | 3 × 2 | 3 × 2 | 12 |
| X (mm) | 7.5 | 7.5 | 7.5 | 7.5 | 7.5 | 7.5 | 7.5 | 7.5 | 7.5 | 7.5 | 7.5 | 7.5 |
| Ha (mm) | 100 | 100 | 100 | 100 | 100 | 100 | 100 | 100 | 100 | 100 | 100 | 100 |
| Ha/H (%) | 91 | 91 | 91 | 91 | 91 | 91 | 91 | 91 | 91 | 91 | 91 | 91 |
| Wa (mm) | 40 | 40 | 55 | 40 | 40 | 40 | 40 | 40 | 40 | 40 × 2 | 40 × 2 | 10 |
| Wa/W (%) | 21 | 21 | 29 | 21 | 21 | 21 | 21 | 21 | 21 | 42 | 21 | 5 |
| Dia. of Hole 16 (mm) | 5 | 5 | 5 | 5 | 5 | 5 | 5 | 5 | 5 | 5 | 5 | 5 |
| Noise (dB) | −1.9 | −2.1 | −2.1 | −0.7 | −0.9 | −1 | −1.1 | −1.3 | −2 | −2.1 | −1.6 | −1.2 |
| Durability of Damper | A | B | A | A | A | A | A | A | A | A | A | A |
| Damper mounting | A | B | A | A | A | A | A | A | A | A | A | A |
| Tire mounting | A | A | B | A | A | A | A | A | A | A | A | A |

Figure 11:
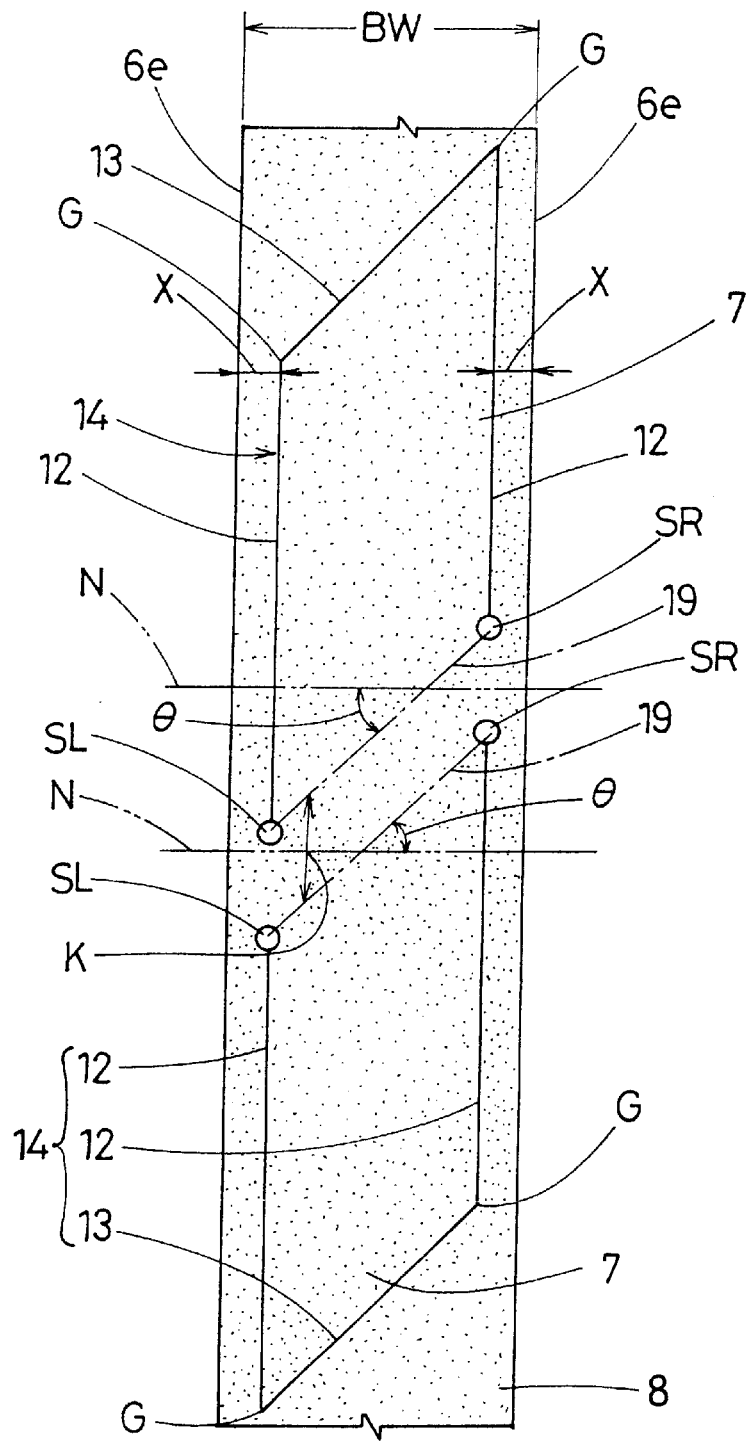
FIG. 11 is a partial view of the damper showing a pair of confronting U-cuts.
Figure 12:
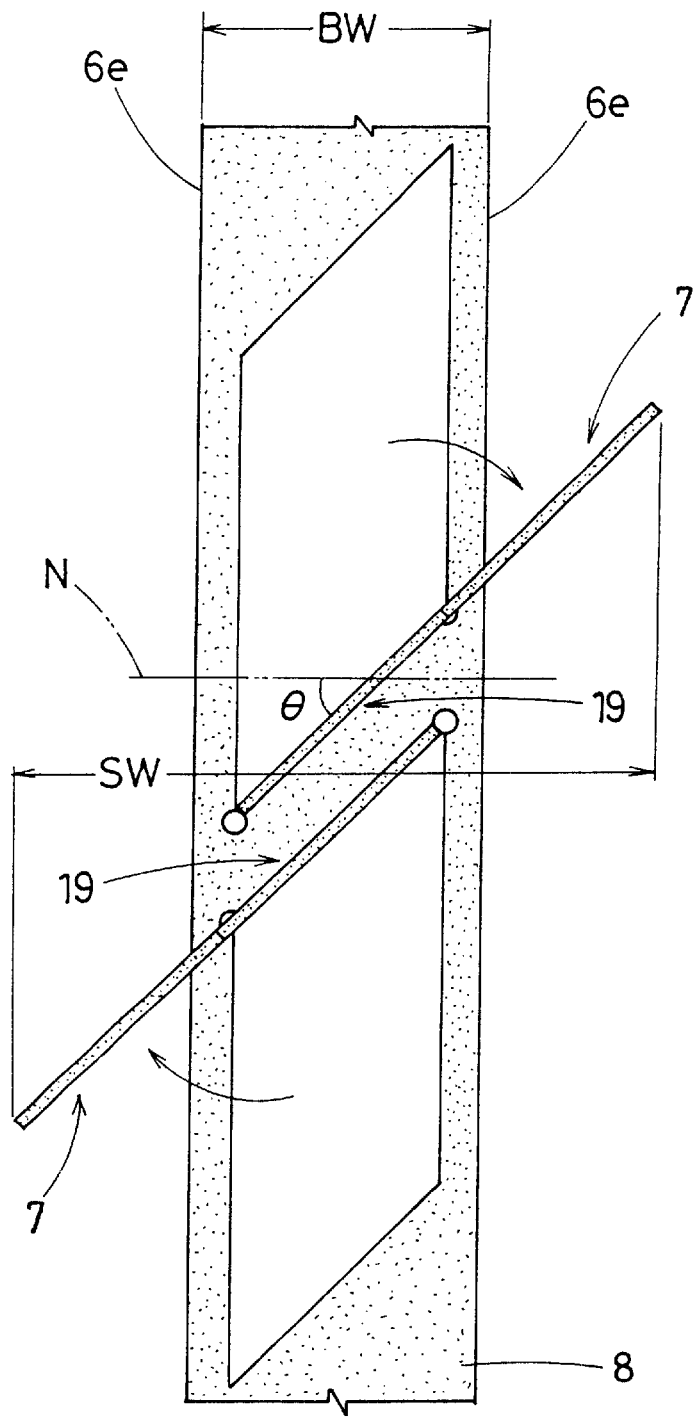
FIG. 12 shows the same part as in FIG. 11 but the flaps are risen obliquely.
Figure 13:
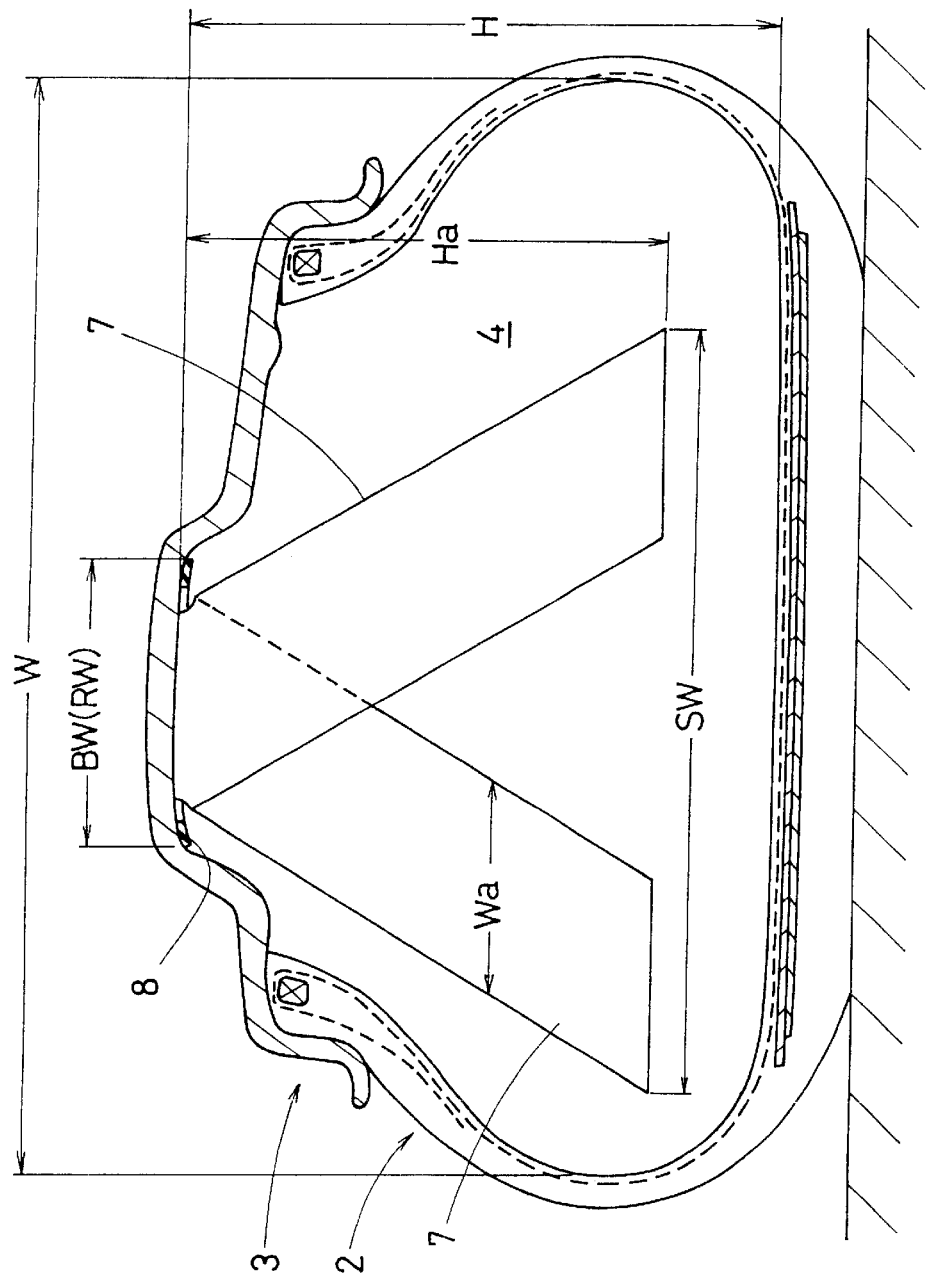
FIG. 13 is a cross sectional view showing the damper which is put around a wheel rim on which a pneumatic tire is mounted.

In FIG. 7 and FIG. 9, Circumferential shift Y = 15 cm
Lb = 110 cm, H = 109 mm, W = 204 mm, Cross sectional area of Tire hollow = 189.8 sq. cm Annular Damper 3A FIGS. 10 to 13 show another example of the damper 5. In this example, as shown in FIG. 11, the dead ends SL and SR of the two longitudinal cuts 12 are disposed at circumferentially different positions, and a bend line 19 drawn straight between the dead ends SL and SR is inclined at an angle θ with respect to the axial direction. The lateral cut 13 extending between the other ends G of the two longitudinal cuts 12 is straight and inclined at the above-mentioned angle θ. The angle θ is set in a range of not more than 45 degrees, preferably 10 to 40 degrees, more preferably 15 to 30 degrees. Therefore, the flap 7 rises obliquely, and as a result, the flap 7 spread in the lateral direction as shown in FIGS. 12 and 13. Thus, the flap 7 in this example is an oblique flap which is parallelogram.

It may be possible that all the U-cuts 14 are oriented towards the same direction. But, it is preferable that a pair of oppositely inclined flaps 7 are formed closely to each other in the circumferential direction to effectively block the annular tire hollow. In this example, therefore, a pair of U-cuts 14 are provided such that the openings of letter "U" confront each other (hereinafter, the "paired confronting U-cuts"). In the paired confronting U-cuts in this example, a bend line 19 drawn straight between the dead ends SL and SR of one of the U-cuts is parallel with that of the other. And the circumferential distance K between these bend lines 19 is set in a range of from 10 to 30 mm, more preferably 10 to 20 mm.

As a result, as shown in FIG. 13, the spread width SW of the paired oppositely inclined oblique flaps becomes more than the band width BW, and the blockade area increases. Usually, one to three pairs of confronting U-cuts are provided on the band 6.

Annular Damper 3B

Figure 14:
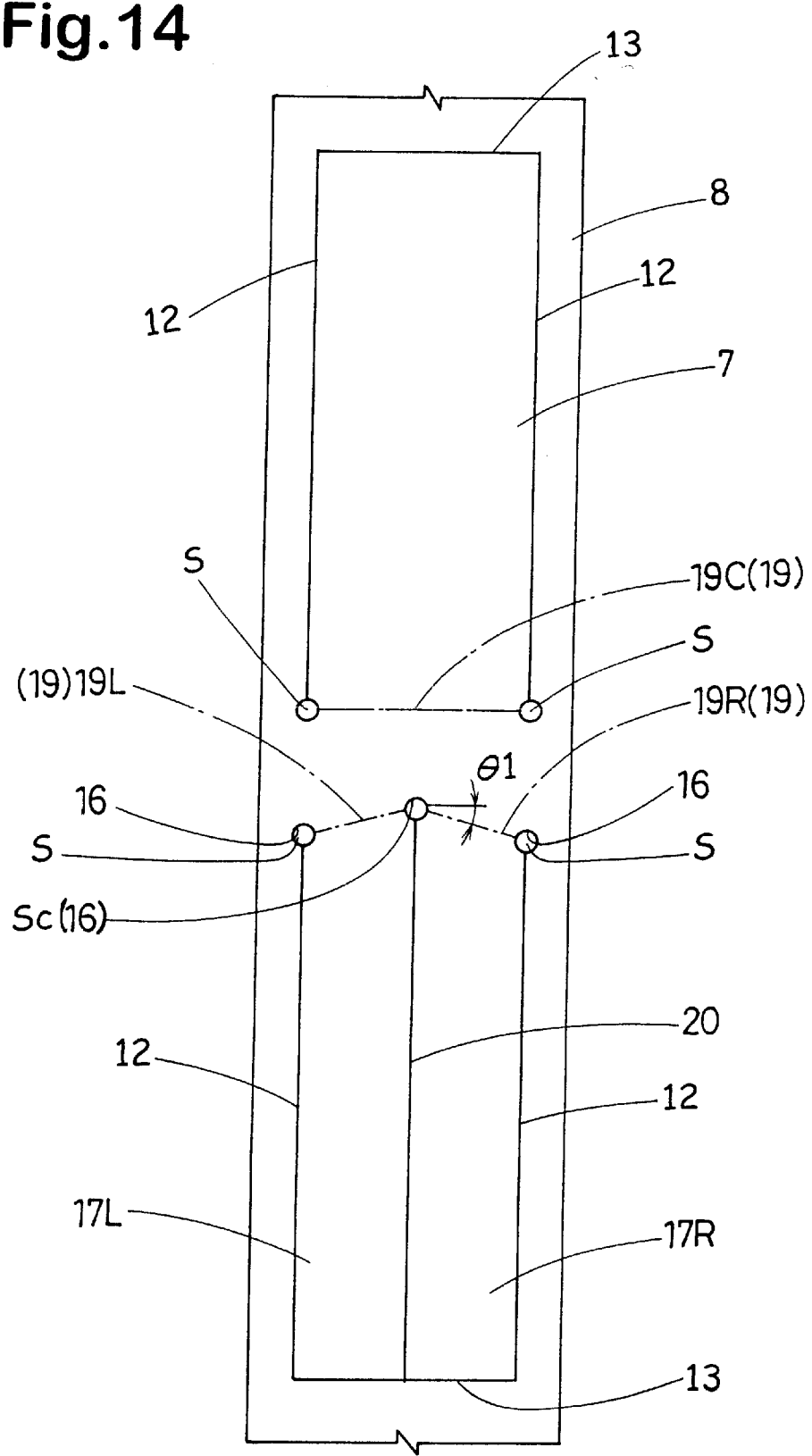
FIG. 14 is a partial view of a damper according to the present invention showing paired confronting basic U-cut and three-pronged U-cut.
Figure 15:
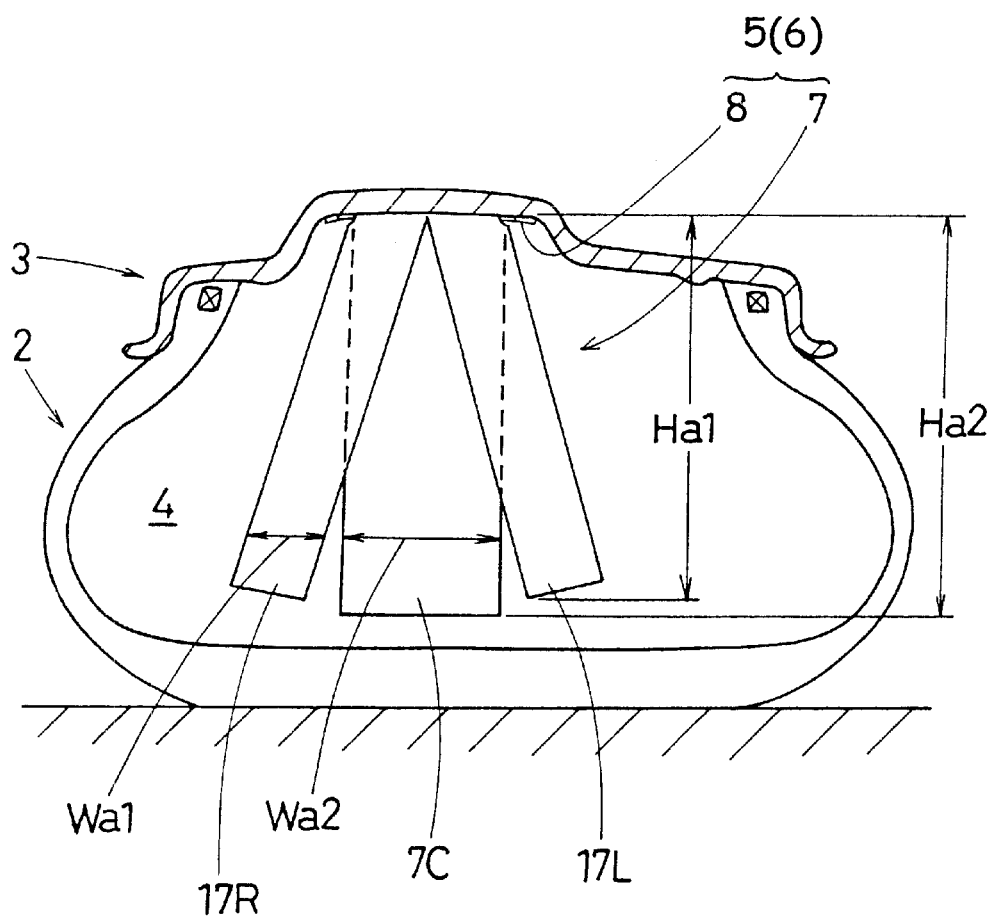
FIG. 15 is a cross sectional view showing the damper which is put around a wheel rim on which a pneumatic tire is mounted.

FIGS. 14 and 15 show another example of the damper 5, wherein the band 6 is provided with paired confronting U-cuts 14. One of the paired confronting U-cuts 14 is the U-cut 14 shown in FIG. 3 (hereinafter "FIG. 3 type U-cut" or "basic U-cut") which consists of the two longitudinal cuts 12 and one lateral cut 13. The other is based on the FIG. 3 type U-cut, but another longitudinal cut 20 is further provided between the two longitudinal cuts 12 (hereinafter "three-pronged U-cut" or "E-cut").

In the E-cut in this example, the central longitudinal cut 20 extends from the lateral cut 13 beyond a straight line drawn between the dead ends S of the longitudinal cuts 12. Bend lines 19L and 19R drawn from the dead end Sc of the central longitudinal cuts 20 to the dead ends S are inclined towards the lateral cut 13 at an angle θ1 with respect to the axial direction. For the angle θ1, the above-mentioned limitation to the angle θ can be used. Accordingly, the flap 7 is divided into narrow parts 17L and 17R which rise in a V-shape and function as oppositely inclining oblique flaps as shown in FIG. 15.

As to the FIG. 3 type U-cut 14, as the dead ends S are disposed near the dead end Sc, a wide normal flap 7 rises to cover the space between the narrow oblique parts 17L and 17R.

Annular Damper 3C

Figure 16:
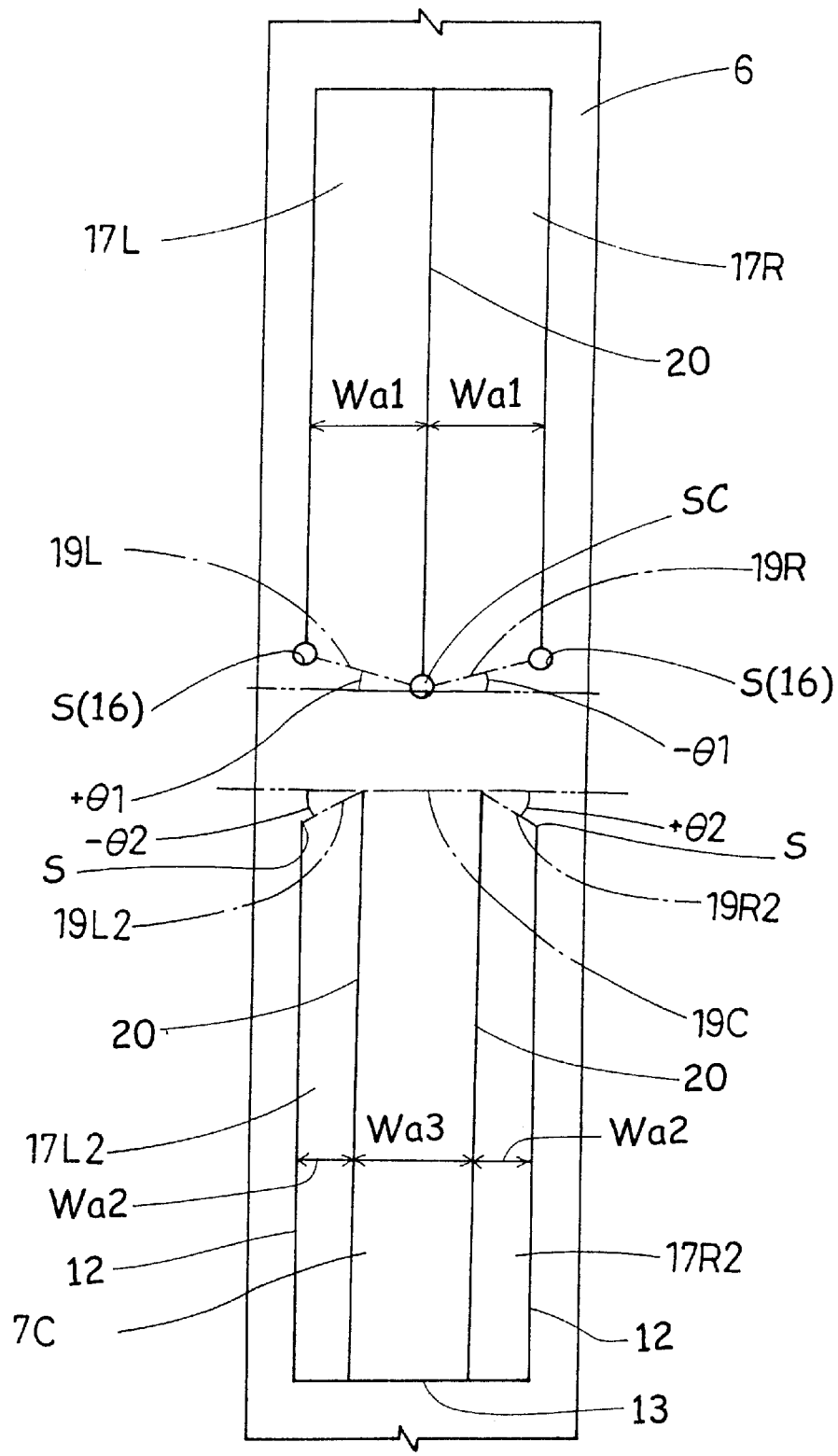
FIG. 16 is a partial view of a damper according to the present invention showing paired confronting three-pronged U-cut and four-pronged U-cut.
Figure 17:
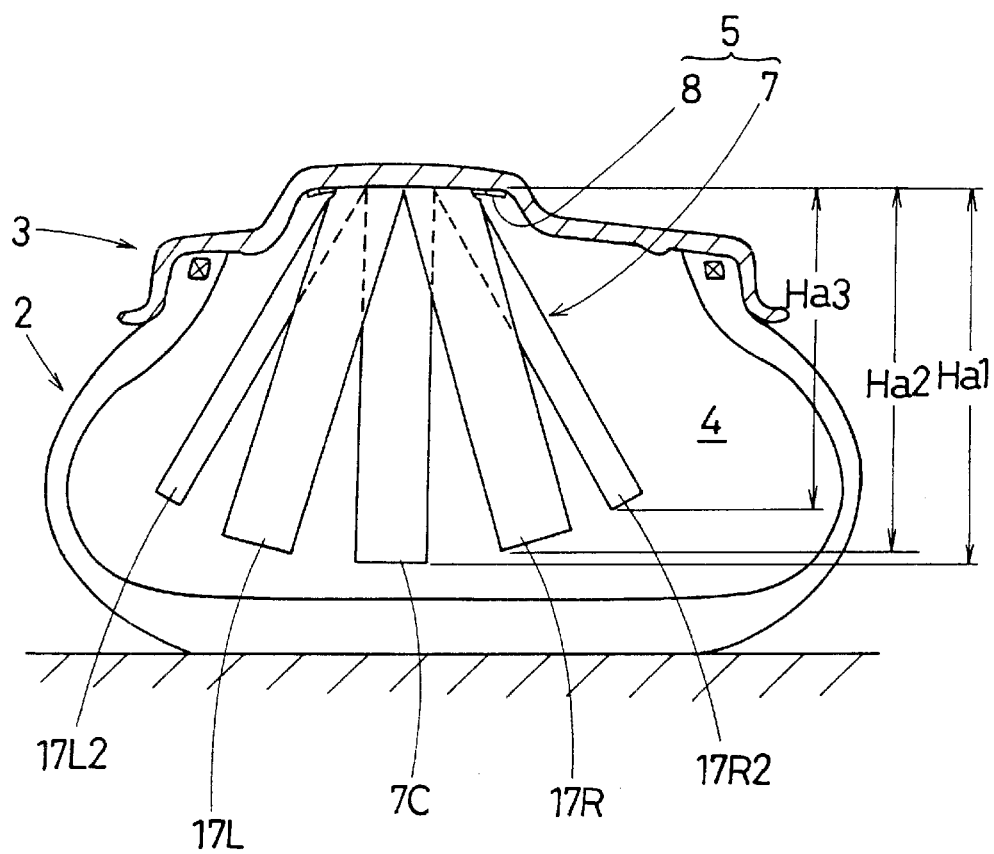
FIG. 17 is a cross sectional view showing the damper which is put around a wheel rim on which a pneumatic tire is mounted.

FIGS. 16 and 17 show another example of the damper 5 similar to the former example. In this example, the band 6 is provided with paired confronting U-cuts 14. One of the paired confronting U-cuts 14 is the above-mentioned E-cut 14. The other is based on the E-cut 14, but another longitudinal cut 20 is further provided. Thus, two parallel central longitudinal cuts 20 are disposed between the outer longitudinal cuts 12 (hereinafter, four-pronged U-cut). A bend line 19C drawn straight between the dead ends Sc of the two central longitudinal cuts 20 is parallel with the tire axial direction. Bend lines 19L2 and 19R2 drawn straight from the dead ends Sc to the dead ends S of the outer longitudinal cuts 12 are inclined towards the lateral cut 13 at an angle θ2 with respect the axial direction.

The angle θ2 is set to be more than the angle θ1 of the E-cut 14. Preferably, the angle θ2 is in a range of from 1.5 to 2.0 times the angle θ1. In this example, the angle θ1 of the E-cut is set in a range of not more than 20 degrees, preferably in a range of from 5 to 20 degrees, more preferably in a range of from 10 to 15 degrees.

Therefore, as shown in FIG. 17, a central normal flap 7C rises from the four-pronged U-cut in the center of the band, and a pair of oblique flaps 17L and 17R rise from the E-cut on both sides of the central normal flap 7C, and further a pair of oblique flaps 17L2 and 17R2 rise from the four-pronged fork on the axially outsides of the oblique flaps 17L and 17R. Thus, when viewed in the circumferential direction, the flaps spread in all directions from the rim well 9.

Comparison test 2

The above-mentioned annular dampers were installed on a 15X6JJ wheel rim (RW=55 mm and Circumference=110 cm at the bottom of the rim well) and then a 195/65R15 radial tire was mounted thereon. The tire was inflated to 200 KPa, and the above-mentioned tests were conducted. The results are indicated in the following Table 2A, 2B and 2C.

TABLE 2A

| Tire | Ref. 1 | Ref. 2 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| BW (mm) | — | 55 | 55 | 55 | 55 | 55 | 55 | 55 | 55 | 55 | 55 |
| La (cm) | — | 102 | 102 | 102 | 102 | 102 | 102 | 102 | 102 | 102 | 102 |
| La/Lb | — | 1.08 | 1.08 | 1.08 | 1.08 | 1.08 | 1.08 | 1.08 | 1.08 | 1.08 | 1.08 |
| Thickness (mm) | — | 1 | 1 | 1 | 1 | 1 | 1 | 1 | 1 | 1 | 1 |
| Flap/U-cut | — | FIG. 11 | FIG. 11 | FIG. 11 | FIG. 11 | FIG. 11 | FIG. 11 | FIG. 11 | FIG. 11 | FIG. 11 | FIG. 11 |
| Number | — | 6 | 6 | 6 | 6 | 6 | 6 | 6 | 6 | 6 | 6 |
| X (mm) | — | 7.5 | 7.5 | 7.5 | 7.5 | 7.5 | 7.5 | 7.5 | 7.5 | 7.5 | 7.5 |
| Wa (mm) | — | 40 | 40 | 40 | 40 | 40 | 40 | 40 | 40 | 40 | 40 |
| Ha (mm) | — | 100 | 100 | 100 | 100 | 100 | 100 | 100 | 100 | 100 | 100 |
| Ha/H (%) | — | 91 | 91 | 91 | 91 | 91 | 91 | 91 | 91 | 91 | 91 |
| θ (deg.) | — | 0 | 5 | 10 | 15 | 20 | 25 | 30 | 35 | 40 | 45 |
| Noise (dB) | 0 | −1 | −1.3 | −1.7 | −2 | −1.8 | −1.5 | −1.2 | −1.2 | −1.1 | −1.1 |
| Durability of Damper | — | A | A | A | A | A | A | A | A | A | A |
| Damper mounting | A | A | A | A | A | A | A | A | A | A | B |
| Tire mounting | A | A | A | A | A | A | A | A | A | A | B |

TABLE 2B

| Tire | Ex. 10 | Ex. 11 | Ex. 12 | Ex. 13 | Ex. 14 |
|---|---|---|---|---|---|
| BW (mm) | 55 | 55 | 55 | 55 | 55 |
| La (cm) | 102 | 102 | 102 | 102 | 102 |
| La/Lb | 1.08 | 1.08 | 1.08 | 1.08 | 1.08 |
| Thickness (mm) | 1 | 1 | 1 | 1 | 1 |
| Flap/U-cut | FIG. 14 | FIG. 14 | FIG. 14 | FIG. 14 | FIG. 14 |
| X (mm) | 7.5 | 7.5 | 7.5 | 7.5 | 7.5 |
| Wa1 (mm) | 20 × 2 | 20 × 2 | 20 × 2 | 20 × 2 | 20 × 2 |
| Ha1 (mm) | 99 | 98 | 97 | 94 | 70 |
| Wa2 (mm) | 25 | 25 | 25 | 25 | 25 |
| Ha2 (mm) | 100 | 100 | 100 | 100 | 100 |
| θ 1 (deg.) | 5 | 10 | 15 | 20 | 25 |
| Noise (dB) | −1.6 | −2 | −2.6 | −1.8 | −1.1 |
| Durability of Damper | A | A | A | A | A |
| Damper mounting | A | A | A | A | A |
| Tire mounting | A | A | A | A | A |

TABLE 2C

| Tire | Ex. 15 | Ex. 16 | Ex. 17 | Ex. 18 | Ex. 19 | Ex. 20 | Ex. 21 | Ex. 22 |
|---|---|---|---|---|---|---|---|---|
| BW (mm) | 55 | 55 | 55 | 55 | 55 | 55 | 55 | 55 |
| La (cm) | 102 | 102 | 102 | 102 | 102 | 102 | 102 | 102 |
| La/Lb | 1.08 | 1.08 | 1.08 | 1.08 | 1.08 | 1.08 | 1.08 | 1.08 |
| Thickness (mm) | 1 | 1 | 1 | 1 | 1 | 1 | 1 | 1 |
| Flap/U-cut | FIG. 16 | FIG. 16 | FIG. 16 | FIG. 16 | FIG. 16 | FIG. 16 | FIG. 16 | FIG. 16 |
| X (mm) | 7.5 | 7.5 | 7.5 | 7.5 | 7.5 | 7.5 | 7.5 | 7.5 |
| Ha1 (mm) | 100 | 100 | 100 | 100 | 100 | 100 | 100 | 100 |
| Ha2 (mm) | 99 | 98 | 97 | 94 | 97 | 97 | 97 | 97 |
| Ha3 (mm) | 98 | 94 | 87 | 77 | 94 | 91 | 82 | 77 |
| Wa1 (mm) | 20 × 2 | 20 × 2 | 20 × 2 | 20 × 2 | 20 × 2 | 20 × 2 | 20 × 2 | 20 × 2 |
| Wa2 (mm) | 10 × 2 | 10 × 2 | 10 × 2 | 10 × 2 | 10 × 2 | 10 × 2 | 10 × 2 | 10 × 2 |
| Wa3 (mm) | 20 | 20 | 20 | 20 | 20 | 20 | 20 | 20 |
| θ1 (deg.) | 5 | 10 | 15 | 20 | 15 | 15 | 15 | 15 |
| θ2 (deg.) | 10 | 20 | 30 | 40 | 20 | 25 | 35 | 40 |
| Noise (dB) | −1.9 | −2.3 | −2.5 | −1.1 | −1.1 | −2.8 | −1.1 | −1 |
| Durability of Damper | A | A | A | A | A | A | A | A |
| Damper mounting | A | A | A | A | A | A | A | A |
| Tire mounting | A | A | A | A | A | A | A | A |

Lb = 110 cm, H = 110 mm, Tire hollow's sectional area = 189.8 sq.cm

Annular Damper 4A

Figure 18:
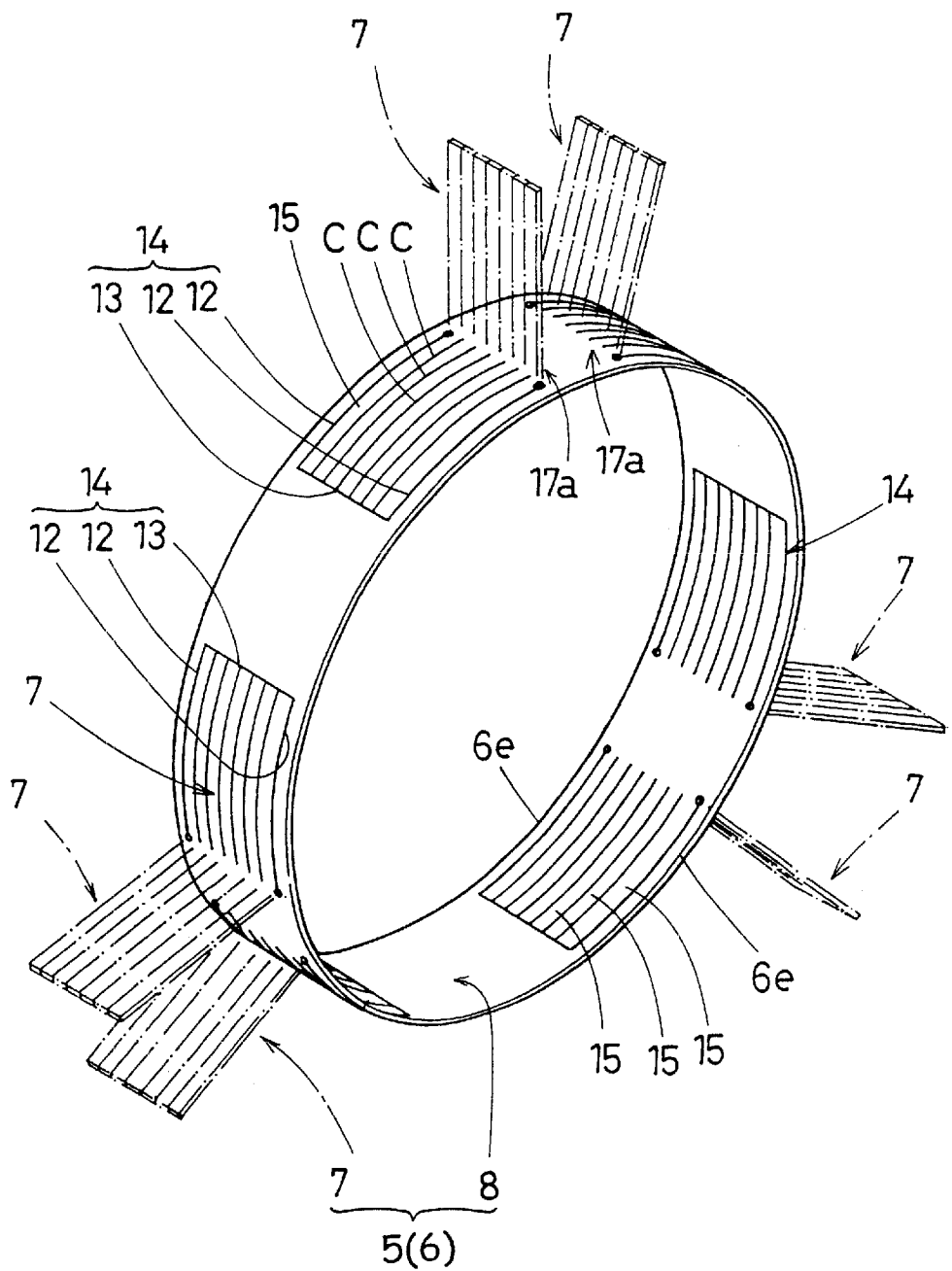
FIG. 18 is a perspective view of a damper according to the present invention.
Figure 19:
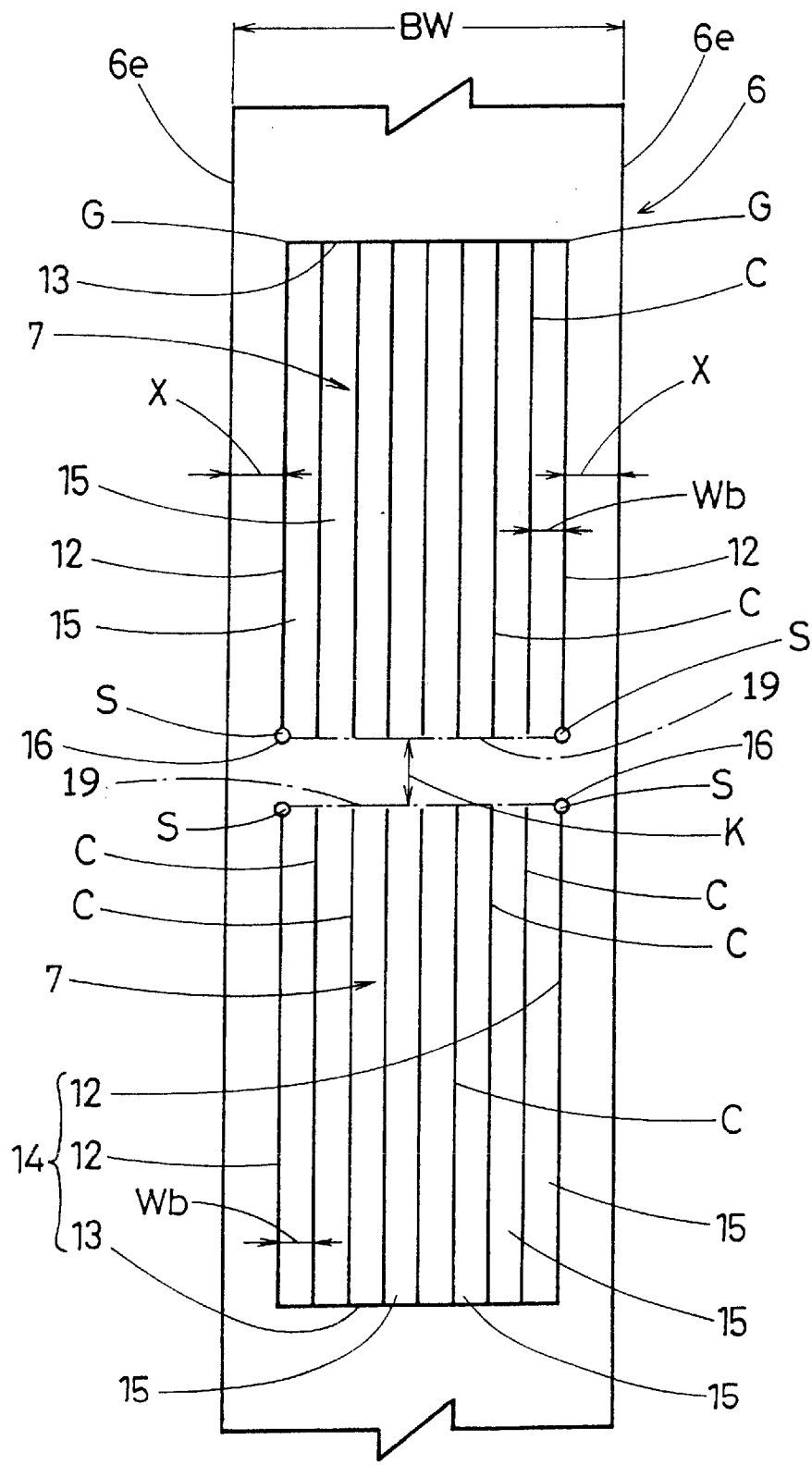
FIG. 19 is a partial view of the damper showing paired confronting shred-U-cuts.

FIGS. 18 and 19 show another example of the damper 5 wherein, similar to the above-mentioned central longitudinal cut 20, the U-cut 14 is further provided with longitudinal cuts C. This is to absorb sound energy but not to spread the flap. (hereinafter, "shred-U-cuts")

The shred-U-cut 14 is based on the FIG. 3 type U-cut comprising the longitudinal cuts 12 and lateral cut 13, and similarly to the above-mentioned E-cut and four-pronged U-cut, additional longitudinal cuts C are provided between the outer longitudinal cuts 12. But, differently from the above-mentioned longitudinal cuts 20, all the longitudinal cuts C do not extend beyond a bend line 19 drawn straight between the dead ends S of the longitudinal cuts 12.

In this example, the dead ends of all the longitudinal cuts C and 12 are aligned, that is, they are disposed on the bend line drawn between the dead ends S of the outer longitudinal cuts 12. Thus, the narrow parts 15 divided by the longitudinal cuts C do not spread when risen, and the adjacent edges can easily contact with each other. Accordingly, when the narrow parts 15 are vibrated by sound pressure, due to the friction between the edges, the sound energy is consumed to damp resonance. Further, a sound reflection by the divided flap becomes a diffused reflection. As a result, a standing wave becomes difficult to occur.

The width Wb of each divided part 15 is preferably set in a range of from 1 to 13 mm, preferably 1 to 10 mm, more preferably 3 to 8 mm. Usually, the number of the divided parts 15 is set in a range of from 5 to 10, preferably from 6 to 8.

Figure 20:
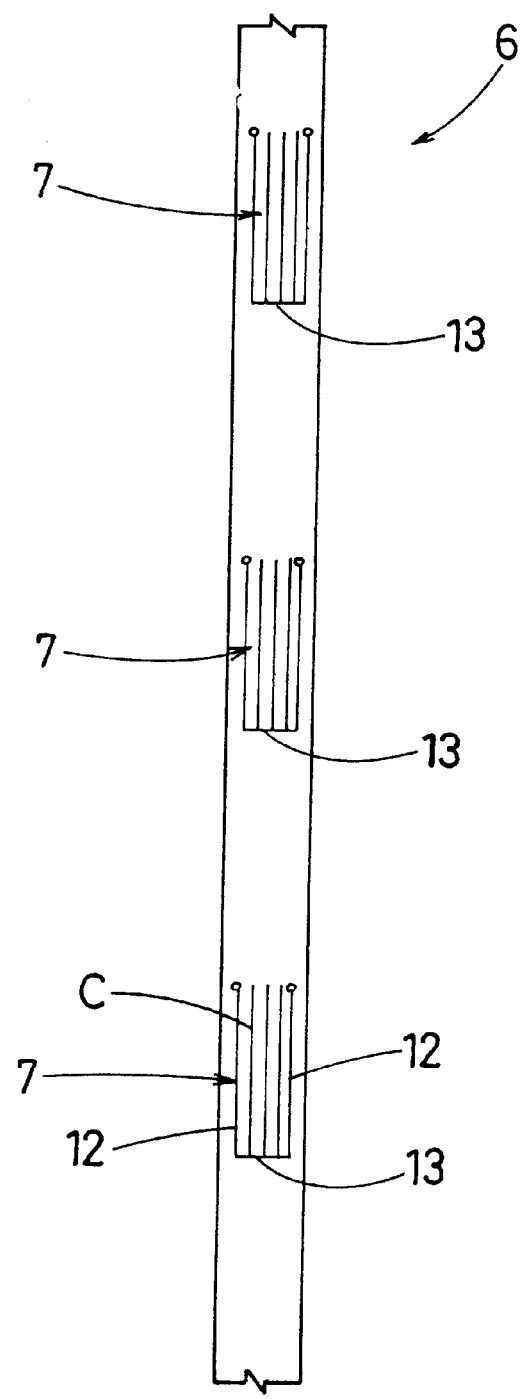
FIG. 20 is a partial view of a damper according to the present invention.

In the example shown in FIGS. 18 and 19, paired shred-U-cuts 14 confront each other. But, as shown in FIG. 20, it is also possible that all the shred-U-cuts 14 are oriented in the same direction.

In case of confronting U-cuts shown in FIGS. 18 and 19, the circumferential distance K between the bend lines 19 is set in a range of from 10 to 30 mm, preferably 10 to 20 mm.

Annular Damper 4B

Figure 21:
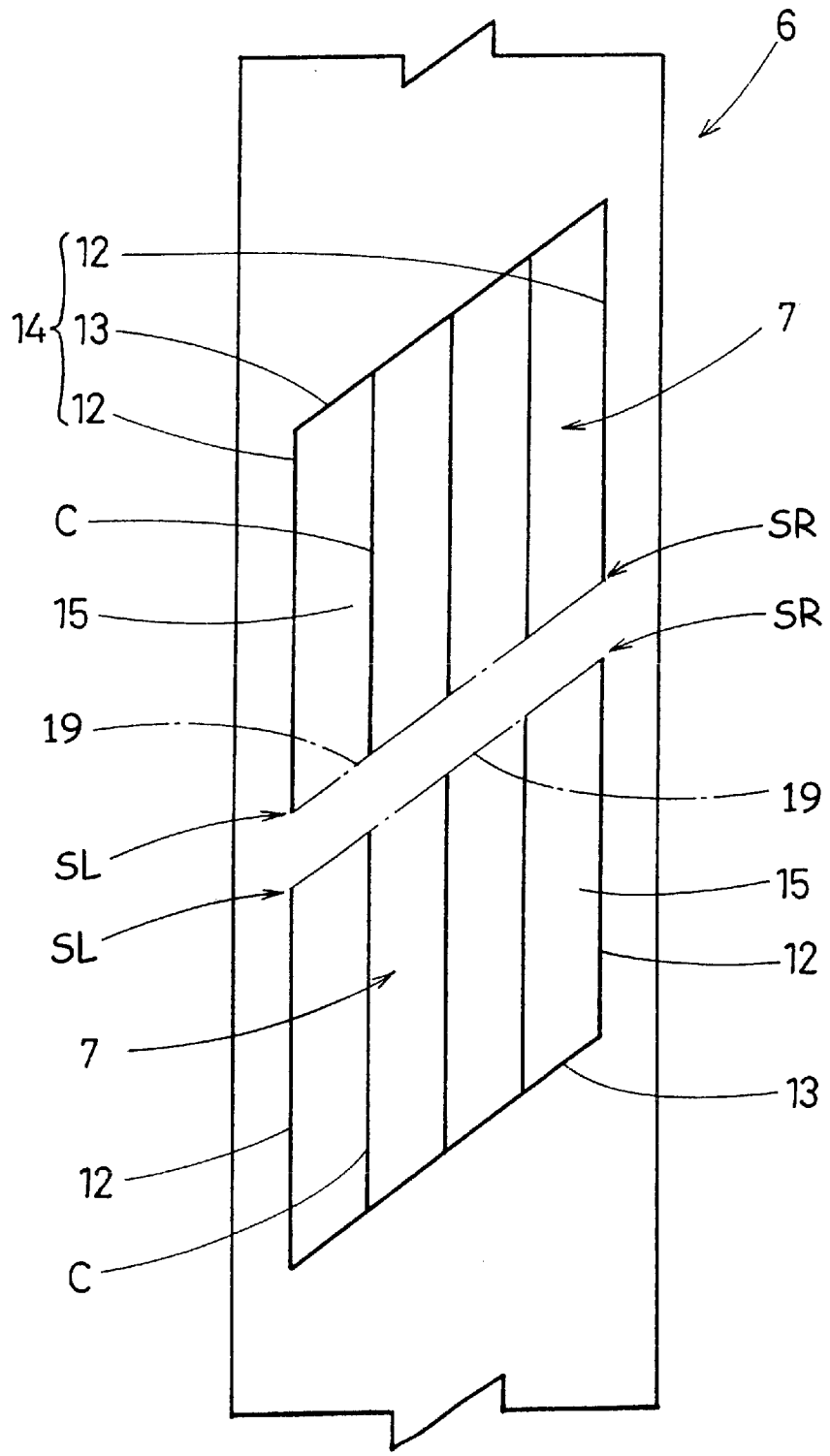
FIG. 21 is a partial view of a damper according to the present invention.
Figure 22:
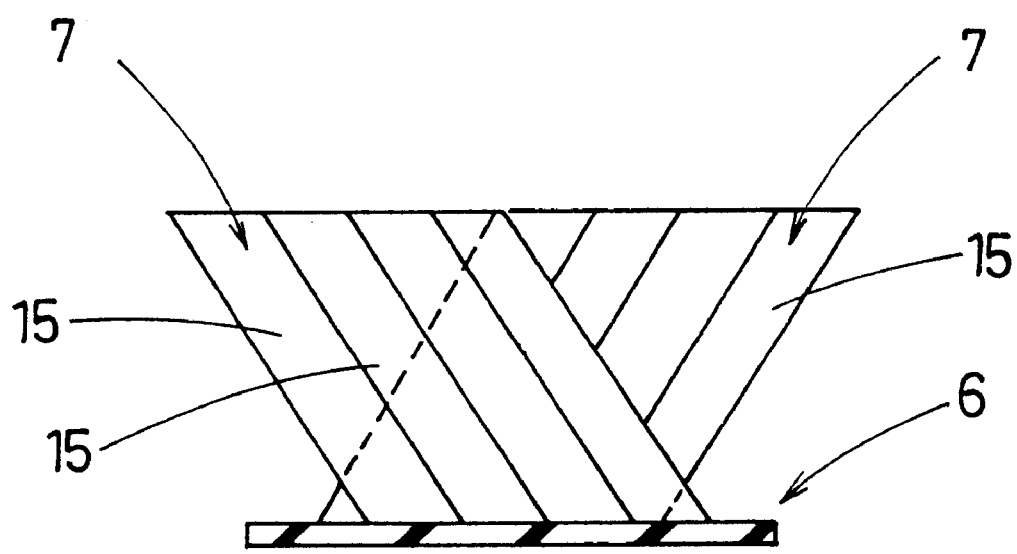
FIG. 22 is a cross sectional view of the damper showing a state that the flaps are risen.

FIGS. 21 and 22 show another example of the damper 5. In this example, the band 6 is provided with paired confronting shred-U-cuts 14. The basic U-cuts thereof made up of cuts 12, 13 and 12 are the same as the example shown in FIG. 11, thus, the flaps 7 rise obliquely towards the opposite directions. Similar to the above example, between the outer longitudinal cuts 12, several additional longitudinal cuts C are provided. The dead ends of all the longitudinal cuts C and 12 are aligned, that is, the dead ends of the longitudinal cuts C are disposed on an inclined bend line 19 drawn straight between the dead ends SL and SR of the outer longitudinal cuts 12. Thus, the narrow parts 15 divided by the longitudinal cuts C are not spread when risen, and the adjacent edges can contact each other.

Annular Damper 4C

Figure 23:
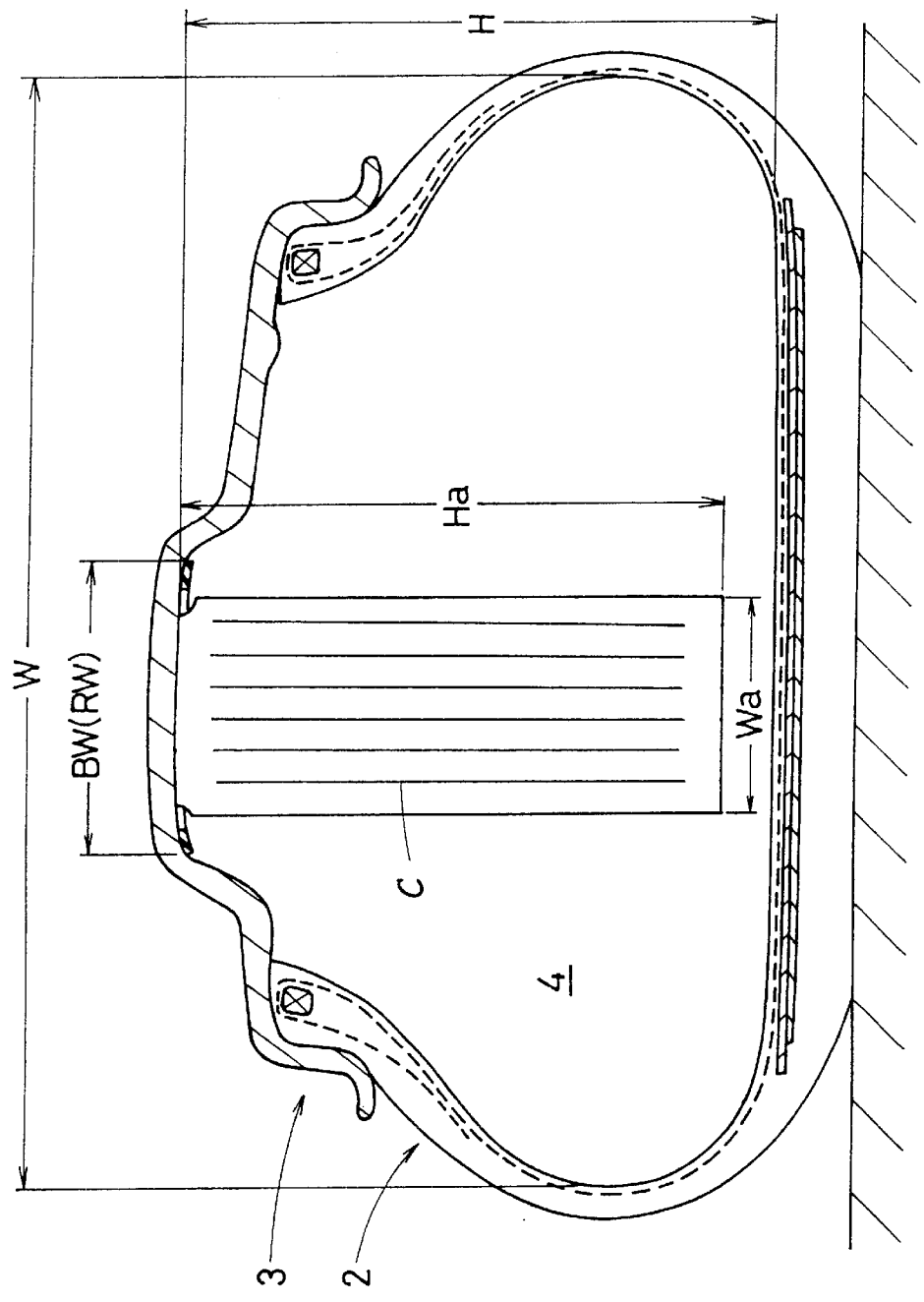
FIG. 23 is a cross sectional view showing a damper according to the present invention which is put around a wheel rim on which a pneumatic tire is mounted.

In the example shown in FIGS. 18 to 22, the central longitudinal cuts C extend up to the lateral cut 13, but as shown in FIG. 23, it is also possible to terminate before the lateral cut 13. This also reduces the sound energy owing to the friction between the edges.

Comparison test 3

The above-mentioned annular dampers were installed on a 15X6JJ wheel rim (RW=55 mm and Circumference=110 cm at the bottom of the rim well) and then a 195/65R15 radial tire was mounted thereon, and the tire was inflated to 200 KPa. And the above-mentioned "Noise test", "Durability test", and "Tire mounting test" were conducted. The test results are as follows.

TABLE 3

| Tire | Ref. 1 | Ex. 1 | Ex. 2 | Ex. 3 | Ex. 4 | Ex. 5 |
|---|---|---|---|---|---|---|
| BW (mm) | — | 55 | 55 | 55 | 55 | 55 |
| La (cm) | — | 102 | 102 | 102 | 102 | 102 |
| La/Lb | — | 1.08 | 1.08 | 1.08 | 1.08 | 1.08 |
| Thickness (mm) | — | 1 | 1 | 1 | 1 | 1 |
| Flap | — | FIG. 20 | FIG. 18 | FIG. 18 | FIG. 21 | FIG. 21 |
| Number | — | 6 | 6 | 6 | 6 | 6 |
| X (mm) | — | 7.5 | 7.5 | 7.5 | 7.5 | 7.5 |
| Ha (mm) | — | 50 | 50 | 50 | 50 | 50 |
| Ha/H (%) | — | 45 | 45 | 45 | 45 | 45 |
| Divided part Width × Length (mm) | 5 × 8 | 5 × 8 | 10 × 4 | 5 × 8 | 10 × 4 | |
| Noise (dB) | 0 | −0.6 | −0.8 | −0.9 | −0.9 | −1 |
| Durability of Damper | — | A | A | A | A | A |
| Damper mounting | A | A | A | A | A | A |
| Tire mounting | A | A | A | A | A | A |

Annular Damper 5A

Figure 24:
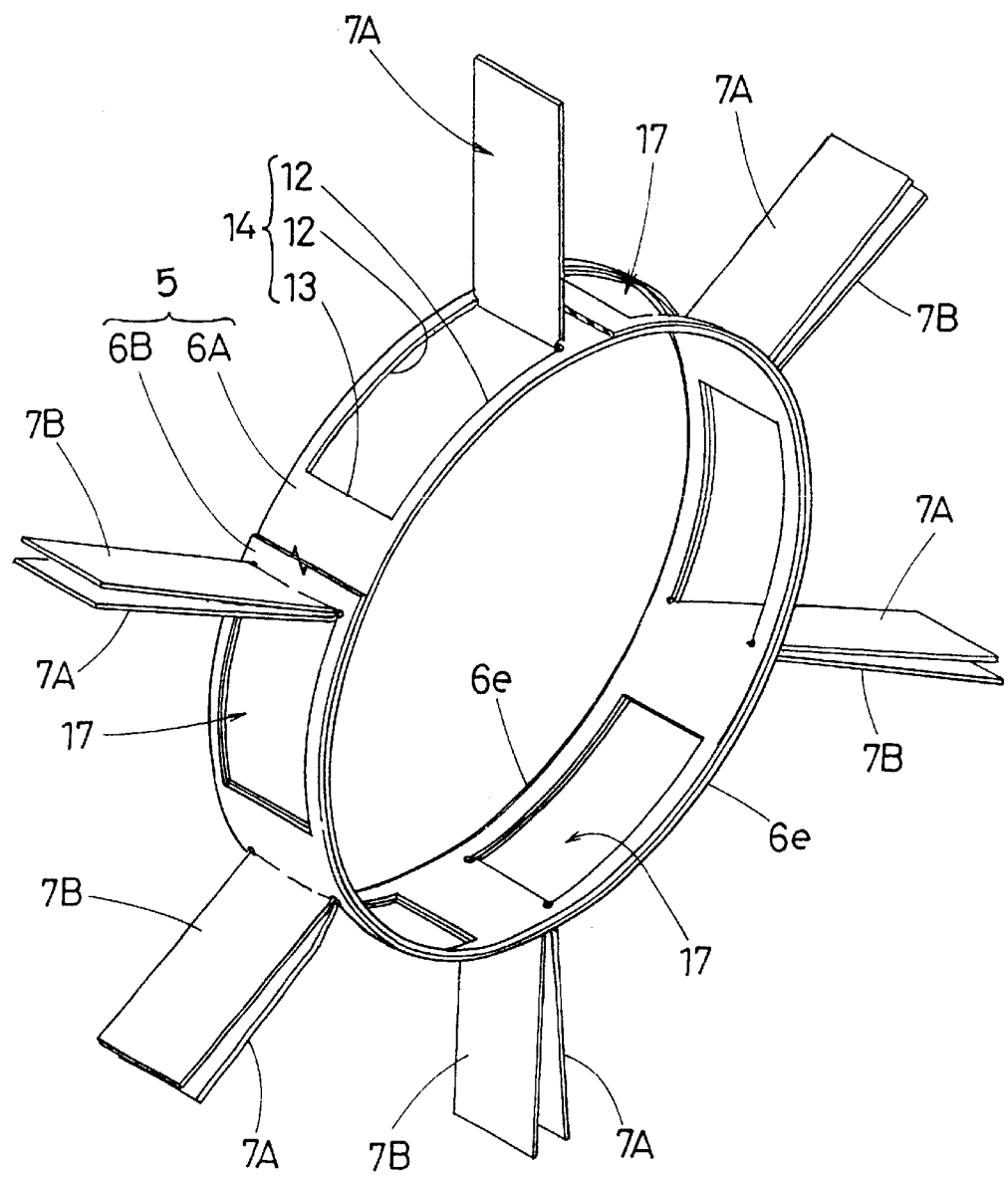
FIG. 24 is a perspective view of a damper according to the present invention.
Figure 25:
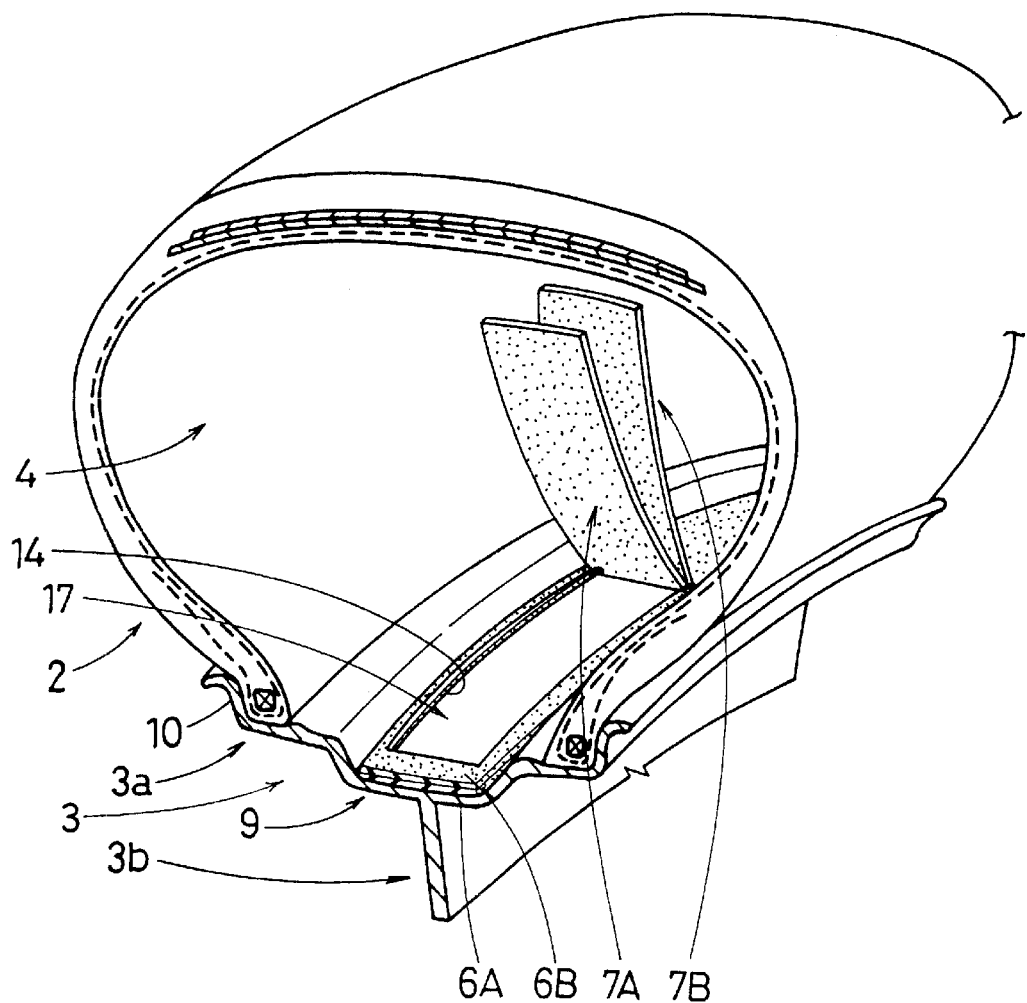
FIG. 25 is a perspective view showing the damper which is put around a wheel rim on which a pneumatic tire is mounted.

FIGS. 24 and 25 show another example of the damper 5 which is composed of a plurality of bands 6 disposed one upon another.

The damper shown is composed of a radially inner band 6A and a radially outer band 6B disposed thereon. Each of them is the same as the band 6 shown in FIG. 2.

The U-cuts 14 of the radially inner band 6A are aligned or completely overlap with the U-cuts 14 of the radially outer band 6B. Therefore, the flap 7A of the radially inner band 6A rise through the holes 17 formed by the U-cuts 14 of the radially outer band 6B after the flaps 7B rise.

This structure can concentrate the rising flaps 7. Therefore, this can be preferably applied to not only the normal flaps but also oblique flaps such as shown in FIGS. 10–17.

Annular Damper 5B

Figure 26:
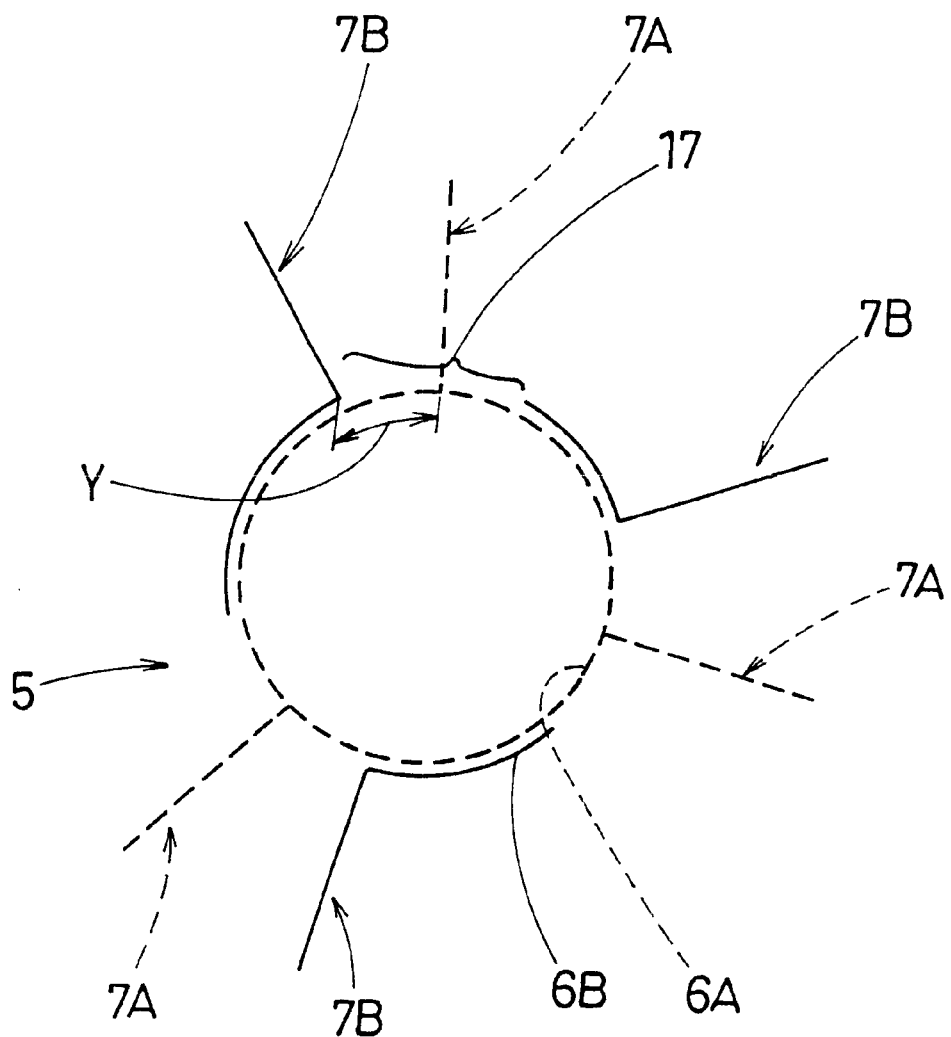
FIG. 26 is a diagram showing a damper according to the present invention.
Figure 27:
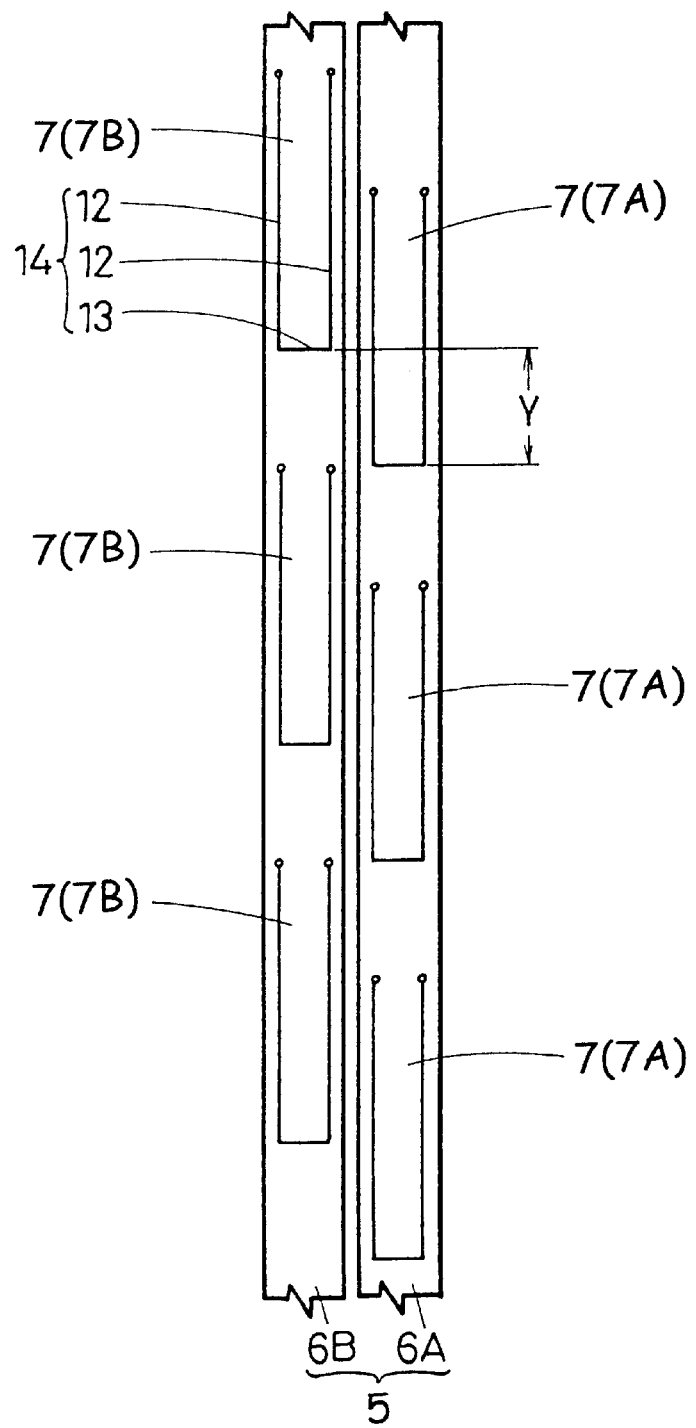
FIG. 27 shows the damper in an unassembled state.

FIGS. 26 and 27 shows a modification of the above double-band damper 5, wherein the outer band 6B is circumferentially shifted from the inner band 6A by a certain distance Y as shown in FIG. 27 which is an exploded view of the damper 5 in which the radially outer and inner band 6B and 6A are displaced parallel in the axial direction. When the outer band 6B is installed on the inner band 6A, a free end portion of each of the radially inner flaps 7A is beforehand pulled out radially outwardly from the hole 17 formed on the outer band 6B by the U-cut 14.

In this case, the rising height Ha can be increased without decreasing the number of the flaps 7. This structure can be applied to not only the normal flaps but also oblique flaps.

Annular Damper 5C

Figure 28:
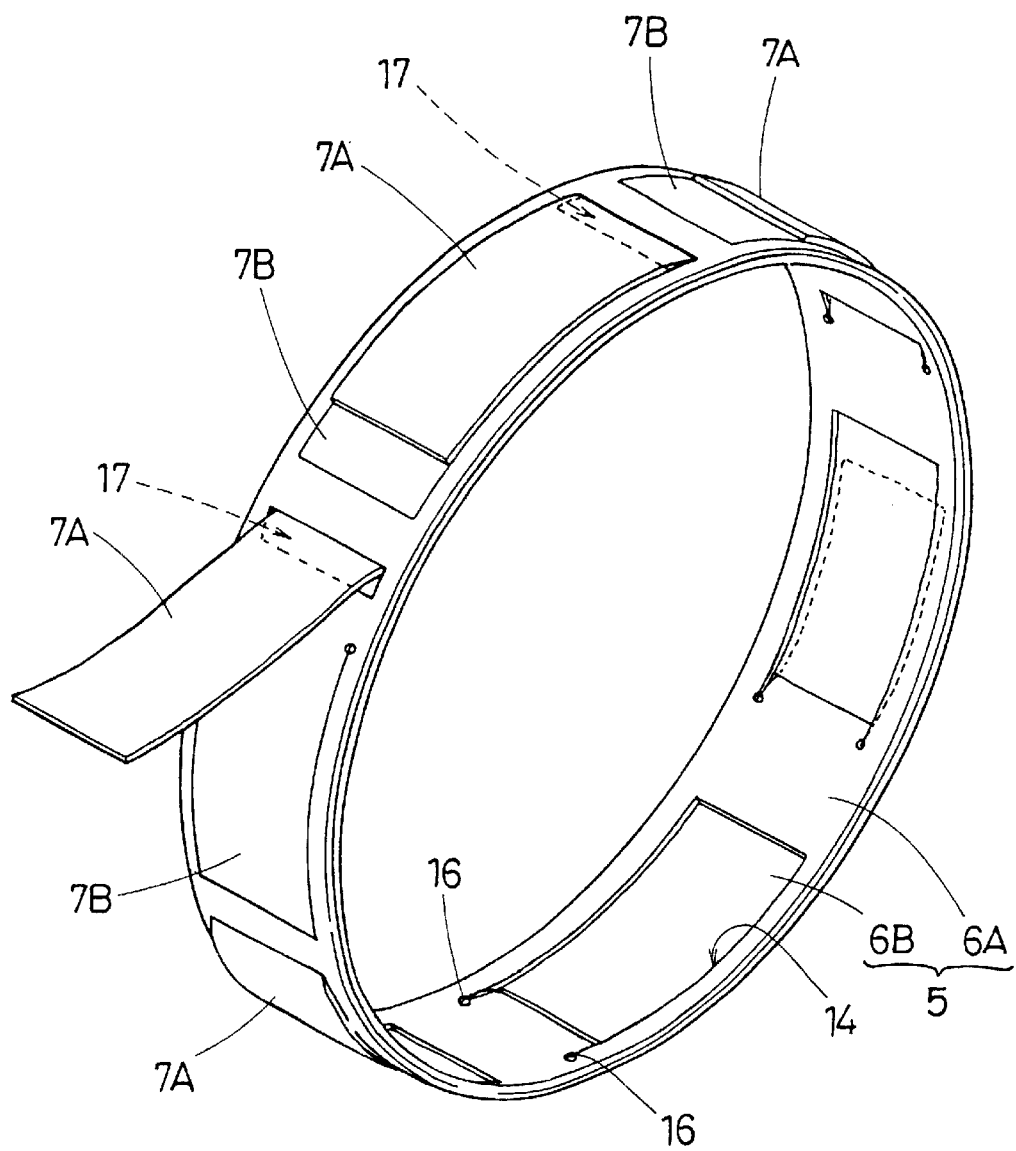
FIG. 28 is a perspective view of a damper according to the present invention.
Figure 29:
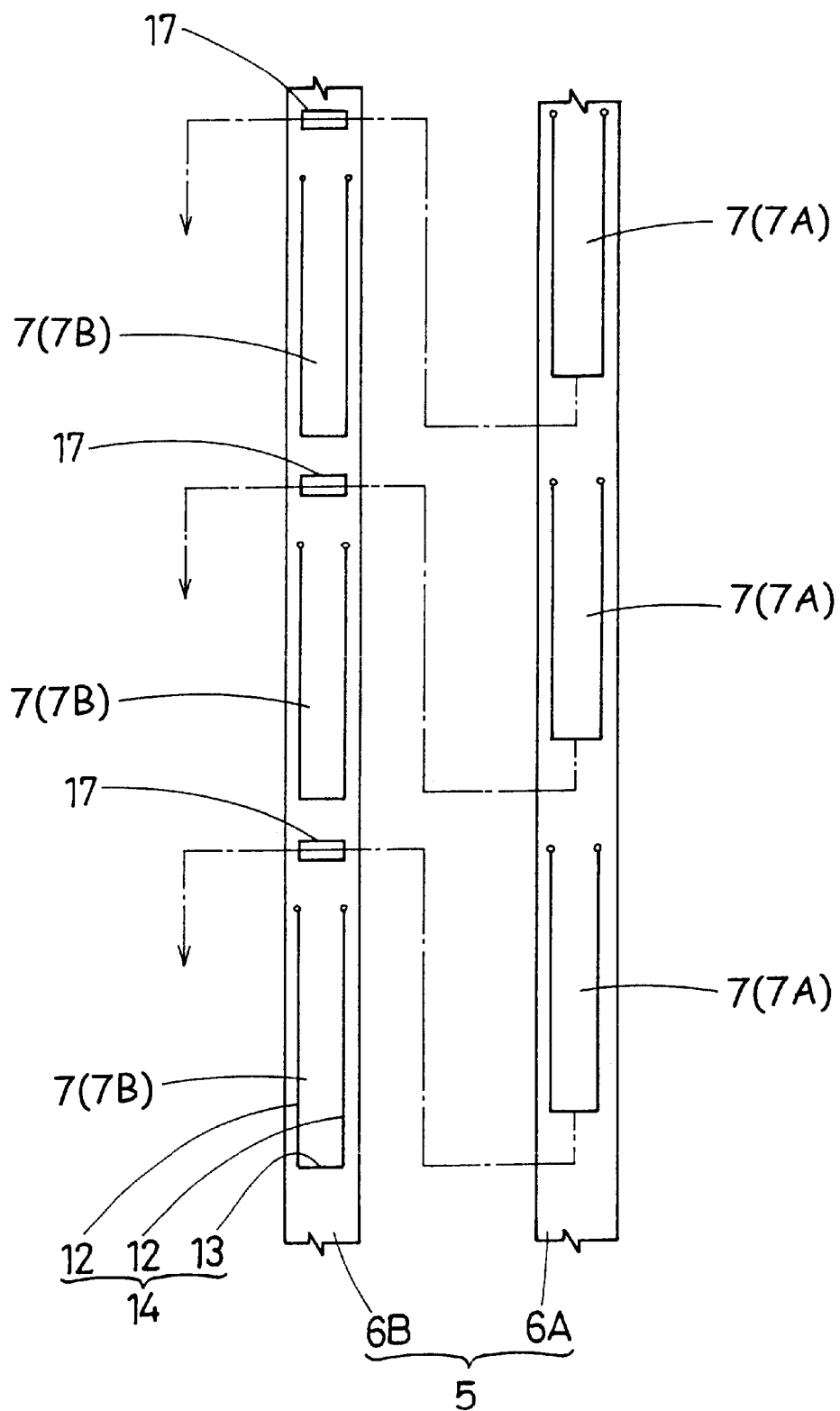
FIG. 29 shows the damper in an unassembled state.

FIGS. 28 and 29 shows a further modification of the double-band damper 5 wherein, in order to pull out the flaps 7A of the radially inner band 6A, the radially outer band 6B is provided with through holes 17 separate from the U-cuts 14 as shown in FIG. 29 which is an exploded view of the damper 5 in which the radially outer and inner band 6B and 6A are displaced parallel in the axial direction.

As another modification of the double-band damper 5, it is also possible to overlay two or more bands (6B, 6C . . . ) on the inner band 6A in the same manner as explained as above.

Comparison test 4

The above-mentioned annular dampers were installed on a 15X6JJ wheel rim (RW=55 mm and Circumference=110 cm at the bottom of the rim well) and then a 195/65R15 radial tire was mounted thereon, and the tire was inflated to 200 KPa. And the above-mentioned "Noise test", "Durability test", and "Tire mounting test" were conducted. The test results are as follows.

TABLE 4

| Tire | Ref. 1 | Ref. 2 | Ex. 1 | Ex. 2 | Ex. 3 | Ex. 4 |
|---|---|---|---|---|---|---|
| No. of band | 0 | 1 | 2 | 3 | 2 | 2 |
| BW (mm) | — | 55 | 55 | 55 | 55 | 55 |
| La (cm) | — | 102 | 102 | 102 | 102 | 102 |
| La/Lb | — | 1.08 | 1.08 | 1.08 | 1.08 | 1.08 |
| Thickness (mm) | — | 1 | 1 | 1 | 1 | 1 |
| Flap Number | — | 3 | 3 × 2 | 3 × 3 | 3 × 2 | 3 × 2 |
| X (mm) | — | 7.5 | 7.5 | 7.5 | 7.5 | 7.5 |
| Ha (mm) | — | 200 | 200 | 200 | 200 | 200 |
| Ha/H (%) | — | 182 | 182 | 182 | 182 | 182 |
| Wa (mm) | — | 40 | 40 | 40 | 40 | 40 |
| Wa/W (%) | — | 21 | 21 | 21 | 21 | 21 |
| Shift Y (mm) | — | | 0 | 0 | 20 | 25 |
| Noise (dB) | 0 | −1.4 | −1.7 | −1.9 | −1.8 | −1.8 |
| Durability of Damper | — | A | A | A | A | A |
| Damper mounting | | A | A | A | A | A | A |
| Tire mounting | | A | A | A | A | A | A |

Lb = 110 cm, H = 110 mm, W = 191 mm
Tire hollow's sectional area = 189.8 sq. cm
Diameter of hole 16 = 5 mm Strip Damper FIGS. 30 to 34 show another embodiment of the present invention, wherein unlike the above-mentioned annular bands 6, the damper 5 is made of a strip of a flexible material having a certain length. The strip comprises a narrow part forming the base 8 secured to the wheel rim 3, and a wide part forming a flap 7 risen by centrifugal force during running. As a result, it has a generally T-shape.

For the material of the damper 5, in addition to the above-mentioned rubber materials, various plastic sheets, a kind of paper and the like may be used. And the thickness is set in a range of 0.5 to 3 mm, preferably 0.5 to 2 mm, more preferably 1 to 2 mm.

In order to fix the damper 5 to the wheel rim 3, adhesive agents, pressure sensitive adhesive double coated tapes, screws, rivets and the like can be used. It is preferable that an adhesive agent or a pressure sensitive adhesive double coated tape is applied to the narrow part 8 in advance which is covered with a separate paper and the like.

In this example, the width of the narrow part 8 is not more than the width RW of the bottom of the rim well 9, and the narrow part 8 is fixed to the bottom of the rim well 9. The wide part 7 is wider than the width RW and protrudes from the rim well 9. The wide part 7 in this example is a substantially rectangle.

The width Wa of the wide part 7 is set in a range of from 58 to 75%, preferably from 65 to 75% of the width W of the tire hollow 4. The maximum rising height Ha is set in a range of from 90 to 130%, preferably from 110 to 130% of the cross sectional height H of the tire hollow 4. The blockade area Ab is not less than 40%, preferably not less than 50%, more preferably not less than 70% of the total sectional area As of the tire hollow 4 under the normally inflated unloaded condition.

Figure 32:
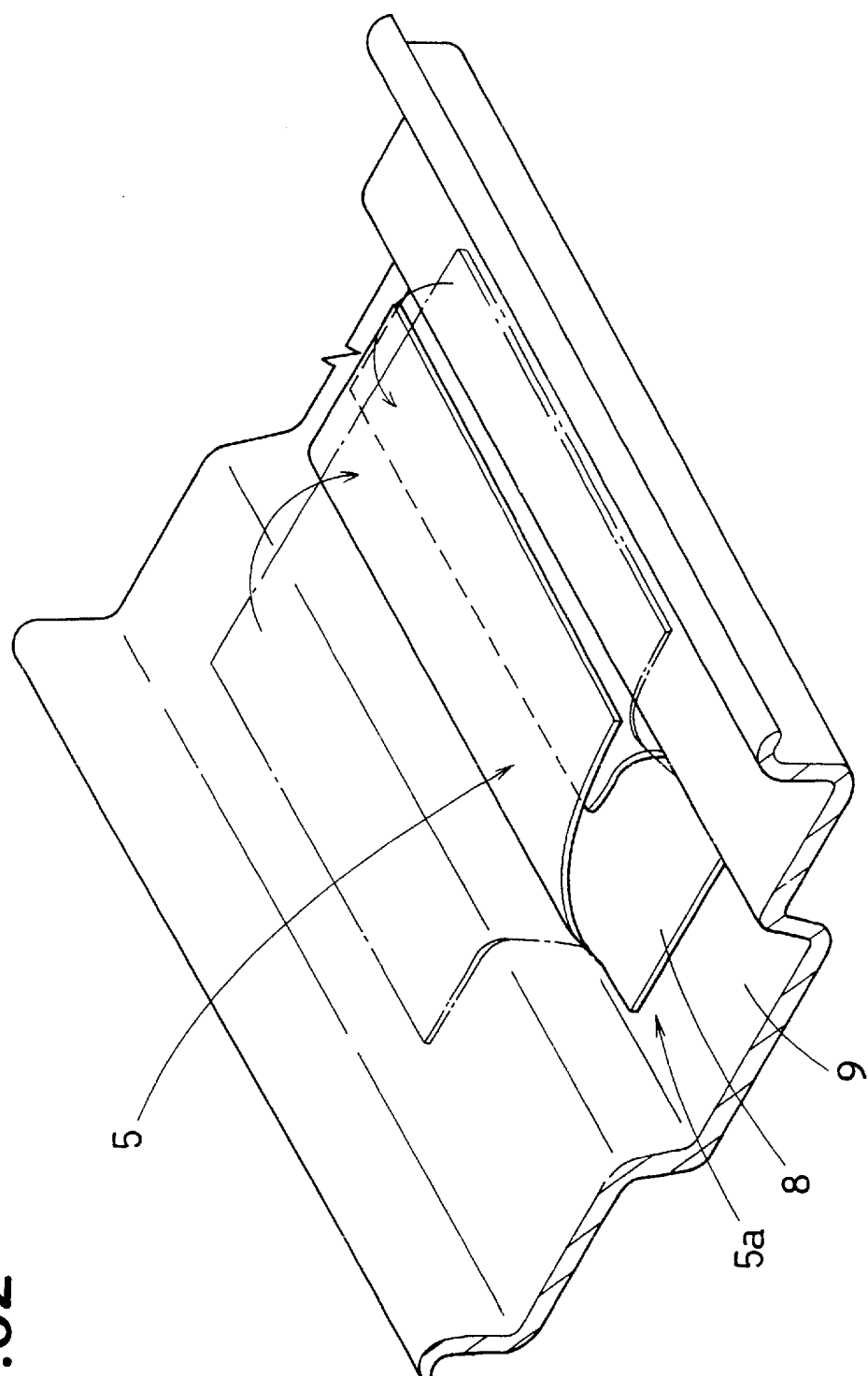
FIG. 32 shows the damper in a folded state.
Figure 33:
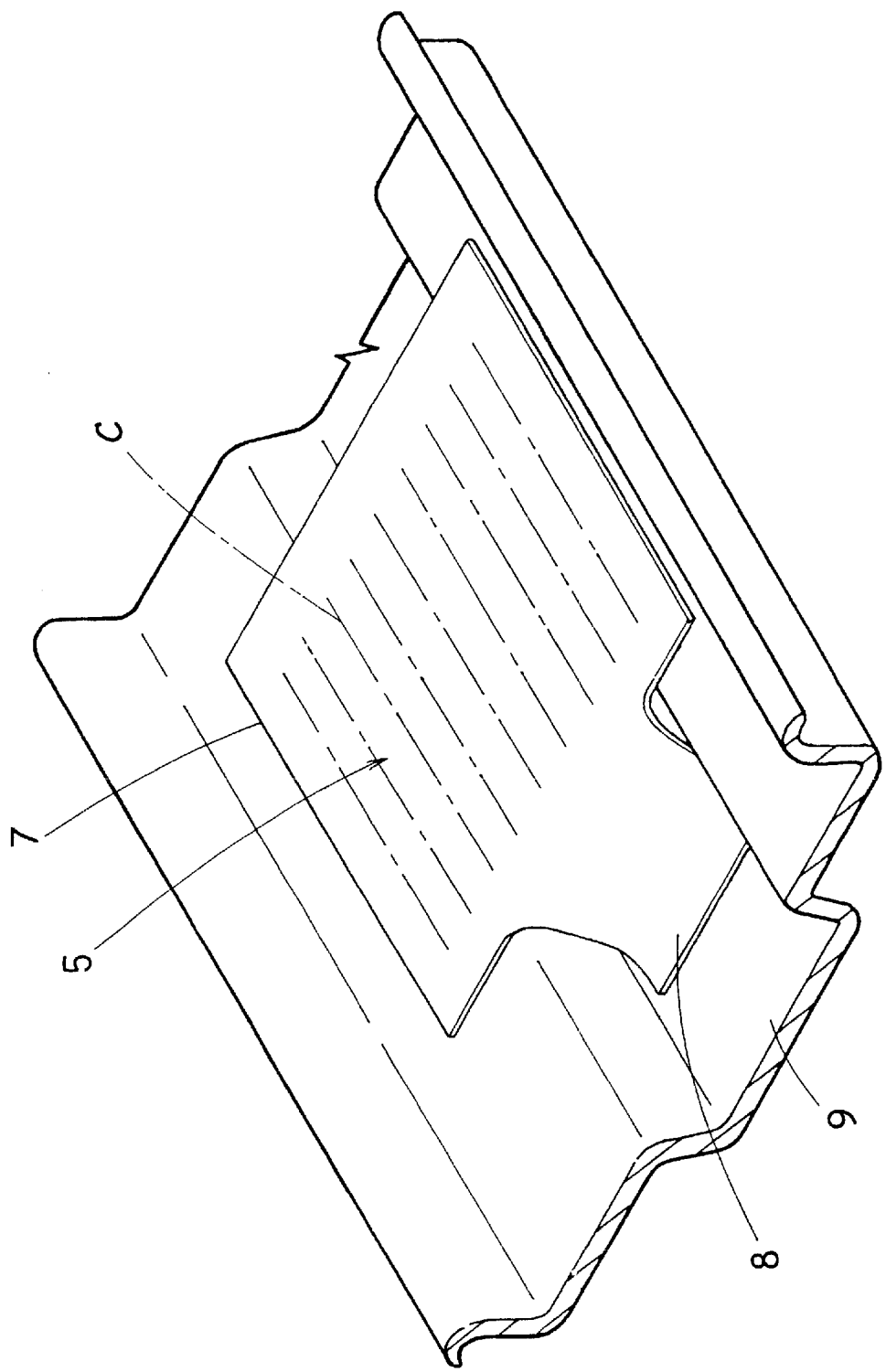
FIG. 33 shows the damper in an unfolded state.
Figure 34:
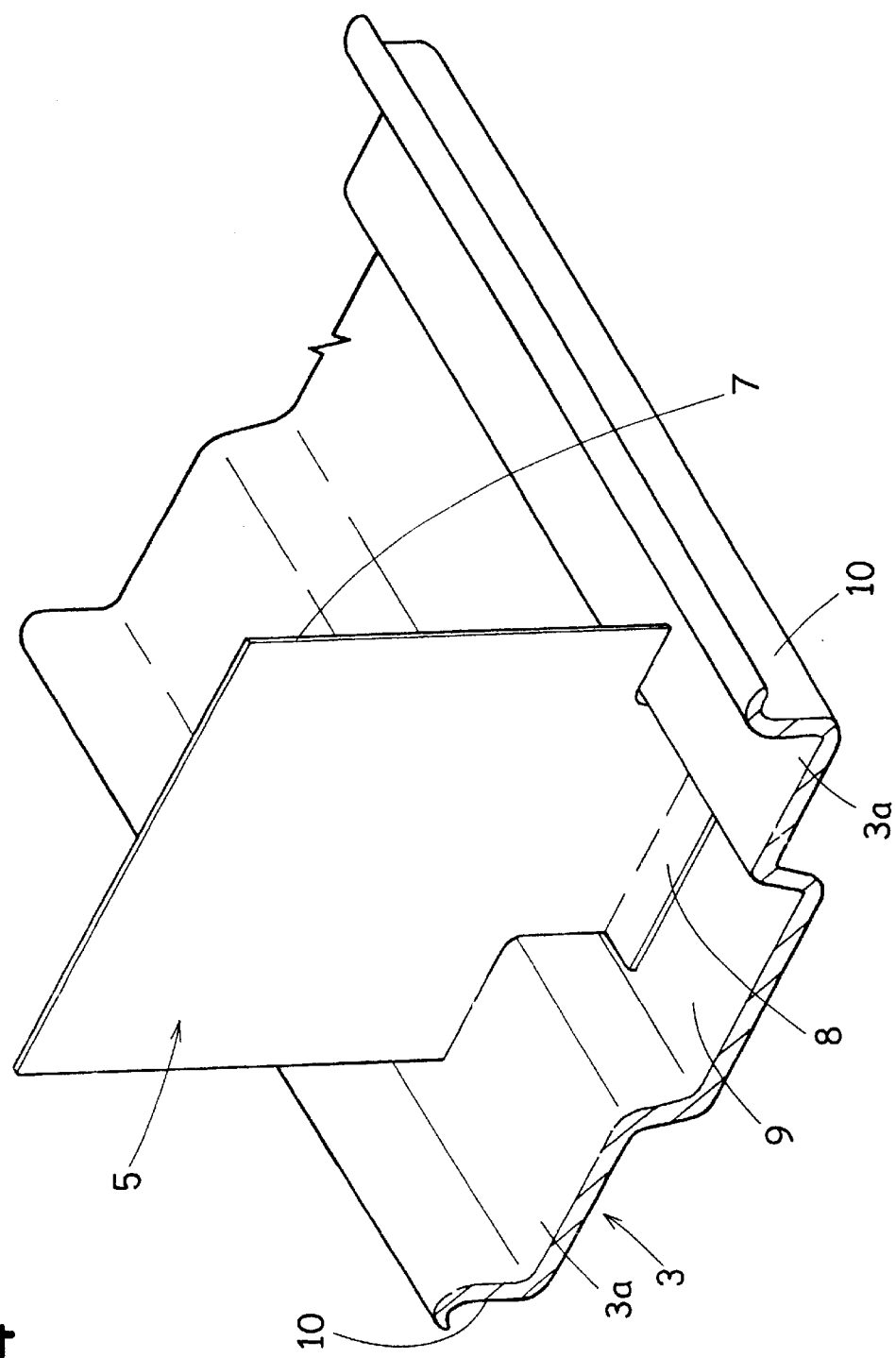
FIG. 34 shows the damper in a rising state.

At the time of mounting the tire 2 on the wheel rim 3, as shown in FIG. 32, the wide part 7 is folded to completely sink into the rim well 9. After the tire 2 is mounted, the wide part 7 is unfolded by its elasticity itself as shown in FIG. 33. When centrifugal force is applied, the wide part (flap) 7 can rise as shown in FIG. 34.

Figure 30:
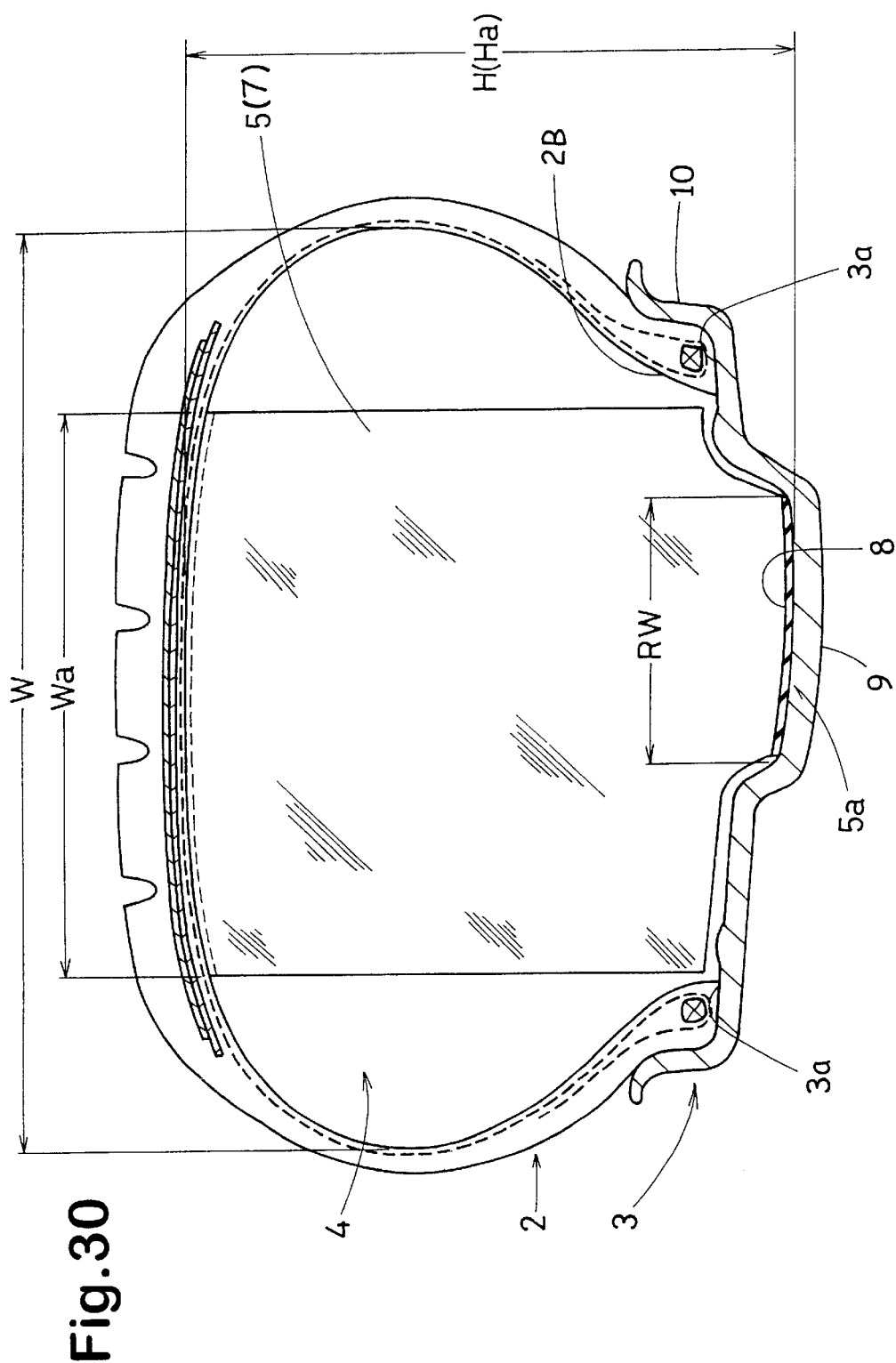
FIG. 30 is a cross sectional view of a tire and rim assembly in which a damper according to the present invention is mounted.
Figure 31:
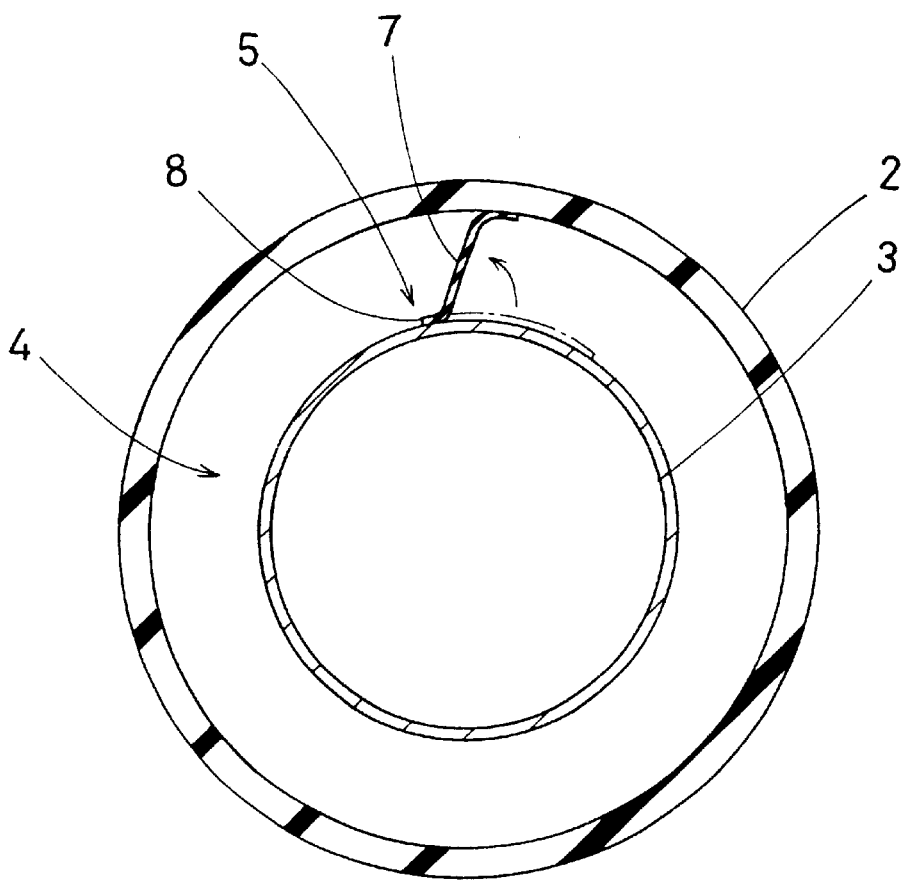
FIG. 31 is a sectional view of the assembly taken along the tire equator.

As shown in FIG. 30, between the wide part 7 and narrow part 8, a transitional part accommodated to the rim profile thus having a variable wide is provided not to interrupt the rising and to increase the blockade area.

As shown in FIG. 33 by imaginary line, longitudinal cuts C may be provided in the wide portion 7 similarly to the FIG. 23 example.

Comparison test 5

The above-mentioned annular dampers were installed on a 15X6JJ wheel rim (RW=55 mm and Circumference=110 cm at the bottom of the rim well) and then a 195/65R15 radial tire was mounted thereon, and the tire was inflated to 200 KPa. And the above-mentioned "Durability test". "Tire mounting test" and the following noise test were conducted. The test results are shown in able 5.

Noise test

The overall noise level of 226, 240 and 253 Hz was measured as explained above, and further sensory noise test was conducted. In the sensory test, the test driver evaluated noise sound into five ranks, wherein the larger the rank number, the better the noise.

TABLE 5

| Tire | Ref. 1 | Ref. 2 | Ref. 3 | Ref. 4 | Ref. 5 | Ref. 6 | Ex. 1 | Ex. 2 | Ex. 3 | Ex. 4 |
|---|---|---|---|---|---|---|---|---|---|---|
| Material |  | rubber | rubber | rubber | rubber | rubber | rubber | rubber | rubber | rubber |
| Ha/H (%) |  | 60 | 77 | 94 | 111 | 111 | 111 | 128 | 111 | 111 |
| Wa/W (%) |  | 58 | 58 | 58 | 29 | 42 | 58 | 58 | 58 | 73 |
| Ab/As (%) |  | 41 | 52 | 64 | 38 | 55 | 75 | 87 | 75 | 96 |
| Noise (dB) | 0 | −1.7 | −4.8 | −5.6 | −0.9 | −3.6 | −6.4 | −6.5 | −6.8 | −6.4 |
| Sensory test | 3 | 3 | 3+ | 3.5 | 3 | 3 | 4 | 4 | 4 | 4 |
| Tire mounting | A | A | A | A | A | A | A | A | A | A |

H = 116 mm, W = 190 mm, Thickness of the flap = 1 mm

What is claimed is:

1. A tire noise damper to be disposed in an annular tire hollow formed between a wheel rim and pneumatic tire mounted thereon, the tire noise damper comprising at least one annular elastic band to be put around the wheel rim, said at least one annular elastic band comprising a base to be secured to the wheel rim and at least one flap extending from the base to be risen radially outwards from the wheel rim by centrifugal force during running to block the annular tire hollow, the annular band provided with at least one u-cut comprising at least a pair of outer longitudinal cuts extending in the circumferential direction and a lateral cut extending therebetween, the u-cut having two ends defined by dead ends of the outer longitudinal cuts, whereby the flap is formed by the u-cut, and said base is formed by the remaining annular portion of the band.

2. The tire noise damper according to claim 1, wherein said at least one annular elastic band is a single annular elastic band.

3. The tire noise damper according to claim 1, wherein said at least one annular elastic band is two or more annular elastic bands disposed side by side.

4. The tire noise damper according to claim 1, wherein said at least one annular elastic band is two or more annular elastic bands disposed one upon another, and the or each flap of a radially inner band rises penetrating a radially outer band.

5. The noise damper according to claim 1, wherein the ends of the u-cut are disposed at the circumferentially same positions, whereby a bend line drawn straight between the ends is substantially parallel with the an axial direction perpendicular to the circumferential direction, and the u-cut forms a normally rising flap.

6. The tire noise damper according to claim 1 wherein the ends of the U-cut are disposed at circumferentially different positions, whereby a bend line drawn straight between the ends is inclined at a certain angle with respect to the axial direction, and the U-cut forms an obliquely rising flap.

7. The tire noise damper according to claim 1 wherein said at least one U-cut is a pair of U-cuts confronting each other to rise circumferentially adjacent flaps.

8. The tire noise damper according to claim 5 wherein said at least one U-cut is a pair of U-cuts confronting each other to rise circumferentially adjacent flaps, and the bend line of one of the U-cuts is substantially parallel with the bend line of the other U-cut.

9. The noise damper according to claim 1, wherein said at least one u-cut is a plurality of u-cuts oriented to a same circumferential direction.

10. The tire noise damper according to claim 1, wherein the or each band is provided with U-cuts in a plurality of circumferential rows.

11. The tire noise damper according to claim 1 wherein the U-cut further comprises at least one central longitudinal cut disposed between said outer longitudinal cuts.

12. The tire noise damper according to claim 1 wherein the U-cut further comprises at least one central longitudinal cut disposed between the outer longitudinal cuts, and said at least one central longitudinal cut extends from the lateral cut towards a bend line drawn straight between the dead ends of the outer longitudinal cuts but does not extend beyond the bend line.

13. The tire noise damper according to claim 1, wherein the U-cut further comprises at least one central longitudinal cut disposed between said outer longitudinal cuts, and said at least one central longitudinal cut extends from the lateral cut beyond a straight line drawn between the dead ends of the outer longitudinal cuts to rise a spreading flap.

14. The tire noise damper according to claim 1, which comprises at least one strip of said fixable material having a certain length, said base is formed by one end portion of the strip, and said flap is formed by the remaining portion of the strip.

15. The tire noise damper according to claim 14, wherein the strip has a wide portion and a narrow portion to have a generally T-shape the narrow portion forms the base to be fixed to the bottom of a rim well, and the wide portion forms the flap.

16. The tire noise damper according to claim 14, wherein the axial width Wa of the flap is in a range of from 58 to 75% of the maximum width of the tire hollow, and the length of the flap is in a range of 90 to 130% of the cross sectional height H of the tire hollow.

17. The tire noise damper according to claim 14, wherein said flap is provided with a plurality of longitudinal cuts each terminated in the flap.

18. The tire noise damper according to claim 14, wherein said base is provided with an adhesive agent or a pressure sensitive adhesive double coated tape covered with a separate sheet.

19. The noise damper according to claim 1, wherein said flexible material is a rubber having a thickness of from 0.5 to 3 mm.

20. The noise damper according to claim 1, wherein the width of each band is not more than the bottom width of a rim well of the wheel rim.

21. The noise damper according to claim 1, wherein round holes for preventing stress concentration are provided at dead ends of the cuts.

22. The tire noise damper according to claim 1 wherein
said at least one U-cut is a pair of U-cuts confronting each other to rise circumferentially adjacent flaps, and
one of the pared U-cuts consists of said outer longitudinal cuts and said lateral cut,
the other U-cut comprises said outer longitudinal cuts and said lateral cut, and further a central longitudinal cut disposed between the outer longitudinal cuts,
the central longitudinal cut extends from the lateral cut beyond a straight line drawn between the dead ends of the outer longitudinal cuts.

23. The tire noise damper according to claim 1 wherein
said at least one U-cut is a pair of U-cuts confronting each other to rise circumferentially adjacent flaps, and
one of the pared U-cuts further comprises a central longitudinal cut disposed between the outer longitudinal cuts and extending from the lateral cut beyond a straight line drawn between the dead ends of the outer longitudinal cuts, and bend lines drawn straight from a dead end of the central longitudinal cut to said dead ends of the outer longitudinal cuts are inclined towards the lateral cut at an angle $\theta 1$ with respect to the axial direction,
the other U-cut further comprises two central longitudinal cuts disposed between the outer longitudinal cuts and extending from the lateral cut beyond a straight line drawn between the dead ends of the outer longitudinal cuts, and bend lines drawn straight from two dead ends of the two central longitudinal cuts to the adjacent dead ends of the outer longitudinal cuts are inclined towards the lateral cut at an angle $\theta 2$ with respect to the axial direction, and a bend line drawn straight from the two dead ends of the two central longitudinal cuts is substantially parallel to the axial direction, and
the angle $\theta 2$ is more than the angle $\theta 1$.

\* \* \* \* \*